(12) United States Patent
Sun et al.

(10) Patent No.: US 12,170,847 B2
(45) Date of Patent: Dec. 17, 2024

(54) INDUSTRIAL CAMERA

(71) Applicant: Keyence Corporation, Osaka (JP)

(72) Inventors: Zhuoli Sun, Osaka (JP); Satoshi Obuse, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 66 days.

(21) Appl. No.: 18/137,461

(22) Filed: Apr. 21, 2023

(65) Prior Publication Data

US 2023/0388636 A1 Nov. 30, 2023

(30) Foreign Application Priority Data

May 26, 2022 (JP) .................................. 2022-085661

(51) Int. Cl.
*H04N 23/69* (2023.01)
*G03B 5/02* (2021.01)
(Continued)

(52) U.S. Cl.
CPC ............... *H04N 23/69* (2023.01); *G03B 5/02* (2013.01); *H04N 5/2628* (2013.01);
(Continued)

(58) Field of Classification Search
CPC ........ H04N 23/69; H04N 23/80; H04N 23/51; H04N 23/54; H04N 23/62; H04N 5/2628; G03B 5/02; G03B 2205/0046
See application file for complete search history.

(56) References Cited

U.S. PATENT DOCUMENTS

2009/0304237 A1* 12/2009 Yoshikawa .......... A61B 5/6826
382/116
2014/0210972 A1* 7/2014 On .................... G02B 23/2469
348/349
(Continued)

FOREIGN PATENT DOCUMENTS

JP 2020169958 A 10/2020

OTHER PUBLICATIONS

U.S. Appl. No. 18/137,457, filed Apr. 21, 2023 (83 pages).
U.S. Appl. No. 18/137,465, filed Apr. 21, 2023 (103 pages).
U.S. Appl. No. 18/137,468, filed Apr. 21, 2023 (90 pages).

*Primary Examiner* — Thai Q Tran
*Assistant Examiner* — Jose M Mesa
(74) *Attorney, Agent, or Firm* — Kilyk & Bowersox, P.L.L.C.

(57) ABSTRACT

An industrial camera includes an electric zoom optical system, an imaging unit generating a captured image with a number of pixels larger than a number of pixels of an inspection target image, an image generation unit executing downscaling a captured image corresponding to an output region of the imaging unit, an interface unit receiving designation of a zoom magnification, and a calculation unit calculating an optical magnification of optical zooming and a magnification of the downscaling based on the zoom magnification. When the zoom magnification is smaller than or equal to a predetermined magnification, an inspection target image is generated by downscaling a captured image at a scaling magnification calculated based on the zoom magnification. When the zoom magnification is larger than the predetermined magnification, the zoom optical system is driven at the optical magnification calculated based on the zoom magnification to generate an inspection target image.

9 Claims, 28 Drawing Sheets

(51) Int. Cl.
    *H04N 5/262*     (2006.01)
    *H04N 23/51*     (2023.01)
    *H04N 23/54*     (2023.01)
    *H04N 23/62*     (2023.01)
    *H04N 23/80*     (2023.01)

(52) U.S. Cl.
    CPC ............ *H04N 23/51* (2023.01); *H04N 23/54* (2023.01); *H04N 23/62* (2023.01); *H04N 23/80* (2023.01); *G03B 2205/0046* (2013.01)

(56) References Cited

U.S. PATENT DOCUMENTS

2015/0288888 A1* 10/2015 Alsheuski .............. G02B 23/12
                                                                          348/240.2
2021/0286339 A1* 9/2021 Link ......................... G06T 7/33

* cited by examiner

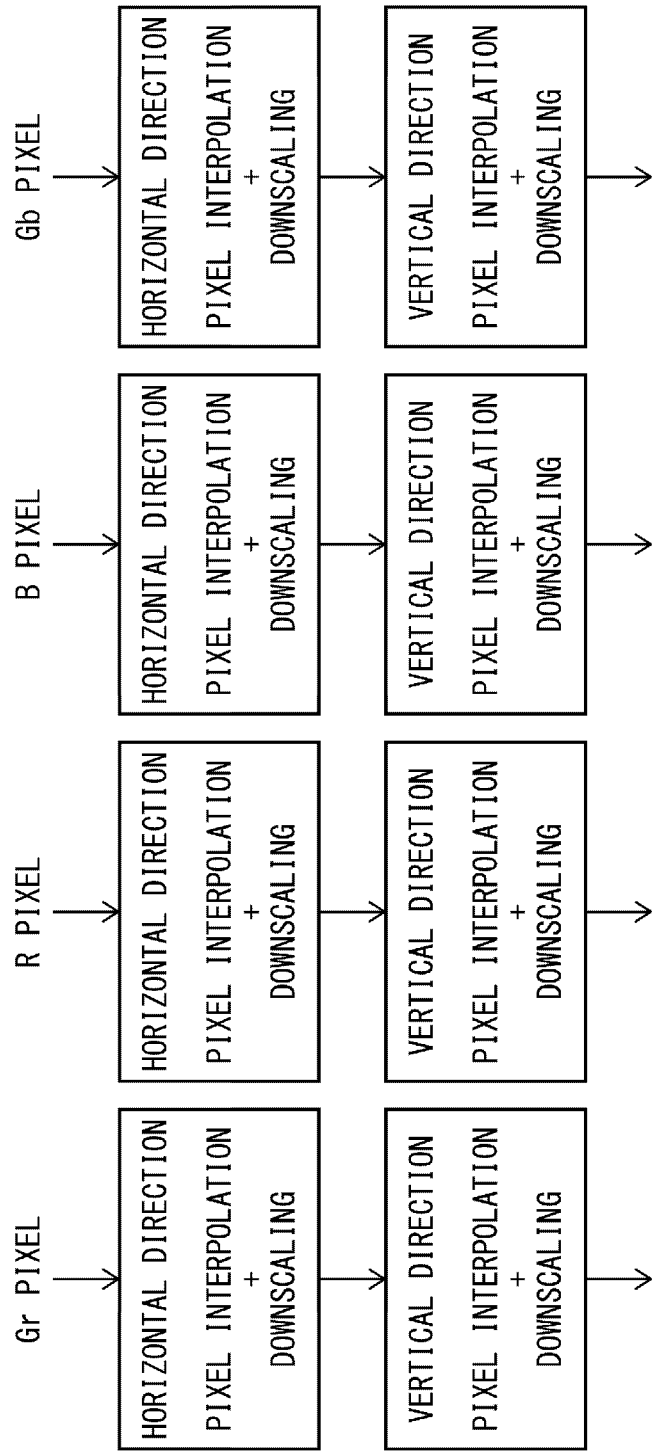

FIG. 27 SETTING FLOW

INDUSTRIAL CAMERA

CROSS-REFERENCE TO RELATED APPLICATIONS

The present application claims foreign priority based on Japanese Patent Application No. 2022-085661, filed May 26, 2022, the contents of which are incorporated herein by reference.

BACKGROUND OF THE INVENTION

1. Field of the Invention

The disclosure relates to an industrial camera that generates an inspection target image obtained by capturing an inspection object such as a workpiece.

2. Description of Related Art

In related art, for example, as disclosed in JP2020-169958, an image inspection system configured to determine quality of an inspection object based on an inspection target image obtained by capturing the inspection object is known.

The image inspection system disclosed in JP2020-169958 causes an imaging device conforming to a standardization standard to perform multi-stage processing in order, and achieves both improvement in a degree of freedom in selecting a model of the imaging device and improvement in accuracy of image inspection.

Incidentally, in the image inspection, it is necessary to correctly select a lens and a camera that satisfy required specifications of a user at a preparation stage before operation, and it is necessary to install the lens and the camera at appropriate positions and angles on a site. In addition, there is a case where an inspection condition is changed after the start of the operation, and in this case, it is necessary to perform a work such as reselection of the lens and the camera as necessary and adjustment of an installation condition and an optical condition. These works are very difficult and are troublesome for the user.

Therefore, as one of the countermeasures, it is considered that a camera having an optical zoom function is used. That is, the camera having the optical zoom function is first installed to be able to capture a wide field of view. After the installation of the camera, it is possible to capture only a necessary field of view by performing optical zooming as necessary.

However, in order to secure a wide field of view fluctuation range, it is necessary to use an optical lens capable of greatly changing a magnification. A size of the optical lens is increased, cost is increased, and a field of view range cannot be finely adjusted. In addition, in optical zooming enlarged along an optical axis, the inspection object may be shifted from a field of view after the fluctuation. In that case, the installation position, an orientation, and the like of the camera need to be manually adjusted.

SUMMARY OF THE INVENTION

The disclosure has been made in view of such a point, and an object of the disclosure is to enlarge a field of view fluctuation range while accuracy of image inspection is increased.

In order to achieve the above object, one aspect of the disclosure can be based on an industrial camera that generates an inspection target image obtained by capturing an inspection object. An industrial camera includes a zoom optical system that is able to electrically perform optical zooming, an imaging unit that is able to generate a captured image with a number of pixels larger than a number of pixels of the inspection target image by capturing an inspection object, an image generation unit that generates an inspection target image with a number of pixels smaller than a number of pixels of a captured image corresponding to an output region that is a region of a field of view range of the imaging unit in whole or part by executing downscaling on the captured image, an interface unit that receives designation of a zoom magnification from a user, and a calculation unit that calculates an optical magnification of the optical zooming and a scaling magnification of the downscaling based on the zoom magnification, and drives the zoom optical system based on the optical magnification. In a case where the zoom magnification is smaller than or equal to a predetermined magnification, the calculation unit calculates a scaling magnification based on the zoom magnification, and the image generation unit generates an inspection target image by downscaling a captured image at the scaling magnification, and in a case where the zoom magnification is larger than the predetermined magnification, the calculation unit calculates an optical magnification of the optical zooming based on the zoom magnification and drives the zoom optical system, and the image generation unit generates an inspection target image based on a captured image generated at the optical magnification.

According to this configuration, the image inspection can be performed by using the inspection target image with the number of pixels smaller than the number of pixels of the captured image by downscaling the first captured image corresponding to the output region of the imaging unit. The inspection target image has a lower resolution than the captured image corresponding to the output region of the imaging unit, but has a resolution enough to ensure necessary inspection accuracy. Thus, there is no problem in inspection accuracy. Here, for example, it is assumed that a part of the inspection object is desired to be enlarged at a preparation stage before operation or after operation. However, in this case, the user designates the zoom magnification via the interface unit, and the optical magnification of the optical zooming and the scaling magnification of the downscaling are calculated. When the zoom magnification is a magnification capable of coping with by downscaling, the inspection target image is generated by downscaling the captured image. On the other hand, when the zoom magnification is a magnification not capable of coping with by downscaling, the zoom optical system is driven to generate the inspection target image based on the generated captured image. As a result, since the downscaling can be preferentially used rather than the optical zooming in which the optical axis is shifted, the inspection accuracy is improved.

In addition, the predetermined magnification can be a zoom magnification at which the second scaling magnification is a scaling limit neighboring magnification near 1 time of a lower limit. In a case where the designated zoom magnification is larger than the predetermined magnification, the image generation unit can generate an inspection target image at the designated zoom magnification by downscaling, at the scaling limit neighboring magnification, the captured image obtained at the optical magnification.

In addition, the interface unit is configured to be able to receive a larger zoom magnification even after the optical magnification of the optical zooming reaches an upper limit. In this case, when the interface unit receives a zoom magnification smaller than an upper limit of the zoom magnification that is able to be received by the interface unit and larger than an upper limit of the optical magnification, the image generation unit can generate an inspection target image by downscaling, at a scaling magnification smaller than the scaling limit neighboring magnification, a captured image captured at an optical magnification of the upper limit. In addition, when the zoom magnification reaches an upper limit of zoom magnification that is able to be received by the interface unit, the calculation unit can execute driving of optical zooming at an optical magnification of the upper limit. The image generation unit can generate, as an inspection target image, a captured image corresponding to the output region captured at the optical magnification of the upper limit.

In addition, the industrial camera may further include an image sensor that receives light concentrated by the zoom optical system to generate an inspection target image. The image sensor includes a photoelectric conversion unit that generates the captured image with the number of pixels larger than the number of pixels of the inspection target image, and a logic unit that executes the downscaling on the captured image based on the scaling magnification calculated by the calculation unit. The photoelectric conversion unit and the logic unit can be mounted on the same chip constituting the image sensor.

As described above, in a case where the zoom magnification is less than or equal to the predetermined magnification, the inspection target image is generated by downscaling the captured image, and in a case where the zoom magnification is larger than the predetermined magnification, the zoom optical system is driven to generate the inspection target image. Accordingly, since the downscaling can be preferentially used rather than the optical zooming in which the optical axis is shifted, the field of view fluctuation range can be enlarged while the accuracy of the image inspection is increased.

BRIEF DESCRIPTION OF THE DRAWINGS

FIG. 11 is a diagram illustrating an example of a user interface screen that receives a zoom instruction and the like;

FIGS. 24A-D are diagrams illustrating a procedure in a case where the color captured image is downscaled;

DETAILED DESCRIPTION OF PREFERRED EMBODIMENTS

Hereinafter, an embodiment of the invention will be described in detail with reference to the drawings. Note that, the following description of a preferred embodiment is merely exemplary in nature and is not intended to limit the invention, an application thereof, or an intended use thereof.

Figure 1:
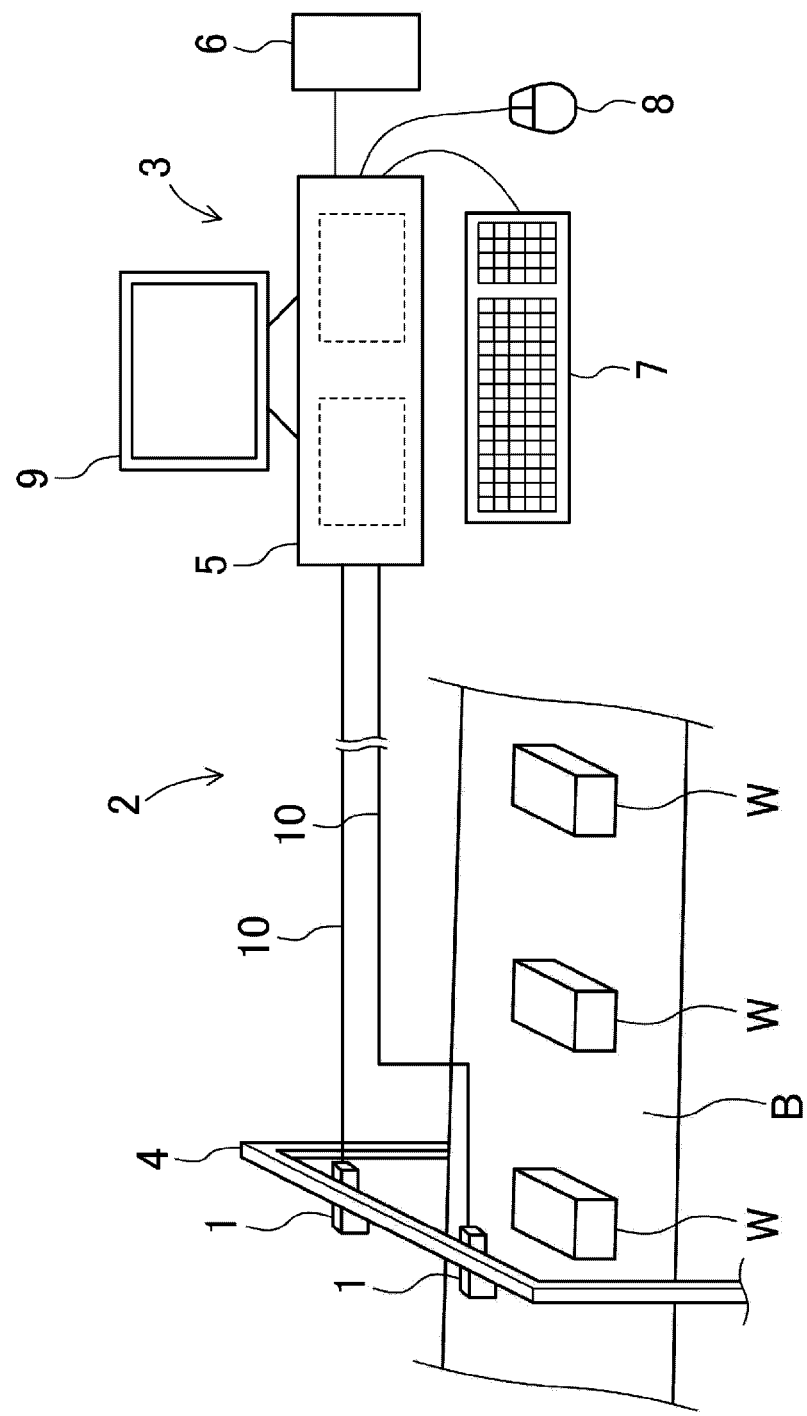
FIG. 1 is an overall view illustrating a use state of an image inspection system including an industrial camera according to an embodiment.

FIG. 1 is an overall view illustrating a use state of an image inspection system 2 including industrial cameras 1 according to an embodiment of the invention. The image inspection system 2 illustrated in FIG. 1 includes two industrial cameras 1 and a control personal computer (hereinafter, referred to as a controller) 3. The number of industrial cameras 1 is not limited to two, and may be one or three or more. Although details will be described later, the industrial camera 1 has a shape as illustrated in FIGS. 2 to 5 and the like, and has an internal structure illustrated in FIG. 6. The industrial camera 1 generates an inspection target image obtained by capturing a workpiece W which is an inspection object. The image inspection system 2 including the industrial cameras 1 that generate such inspection target images can also be referred to as an image processing apparatus.

Although not illustrated, for example, the industrial camera 1 can receive a trigger signal output from a programmable logic controller, a sensor that detects the arrival of the workpiece W, or the like. The industrial camera 1 that receives the trigger signal generates the inspection target image by executing imaging processing. In addition, the industrial camera 1 may generate the inspection target image by repeatedly executing imaging processing inside without receiving the trigger signal from an outside. Although not illustrated, the image inspection system 2 may include an illumination unit that illuminates the workpiece W, and the illumination unit is controlled to illuminate the workpiece W in synchronization with the imaging processing of the industrial camera 1.

In the present example, as illustrated in FIG. 1, a case where a site where a plurality of workpieces W are sequentially conveyed by a conveying device such as a belt conveyor B will be described as a site where the industrial camera 1 is used, but the site may be a site where a stationary workpiece W is inspected. The industrial camera 1 is attached to a camera attachment member 4, and is installed at a predetermined position in a predetermined posture.

The controller 3 performs various settings and the like of the industrial camera 1, and can be, for example, a desktop personal computer, a notebook personal computer, or the like, or can be a calculation device dedicated to image inspection, and a form thereof is not particularly limited. The controller 3 includes a body 5, a storage unit 6, a keyboard 7, a mouse 8, and a monitor 9. The body 5 is connected to the industrial cameras 1 to be able to communicate via a cable 10. A control unit 5a including a central processing unit, a ROM, a RAM, and the like are provided in the body 5. In addition, the storage unit 6 is a hard disk drive, a solid state drive, or the like, and stores a program for operating the control unit 5a, setting information, various images, and the like of the industrial cameras 1. Apart of the storage unit 6 may be provided in the industrial cameras 1, and in this case, setting information, various images, and the like of the industrial cameras 1 can be retained in the industrial cameras 1.

The keyboard 7 and the mouse 8 are used as an operation unit for operating the controller 3, and operation states of the keyboard 7 and the mouse 8 are detected by the control unit 5a. The operation unit is not limited to the keyboard 7 and the mouse 8, and may be a so-called touch panel type operation unit. The monitor 9 is, for example, a liquid crystal display device, and can display various user interfaces for setting the industrial cameras 1 under the control of the control unit 5a, various images, and the like.

(Configuration of Industrial Camera)

Figure 6:
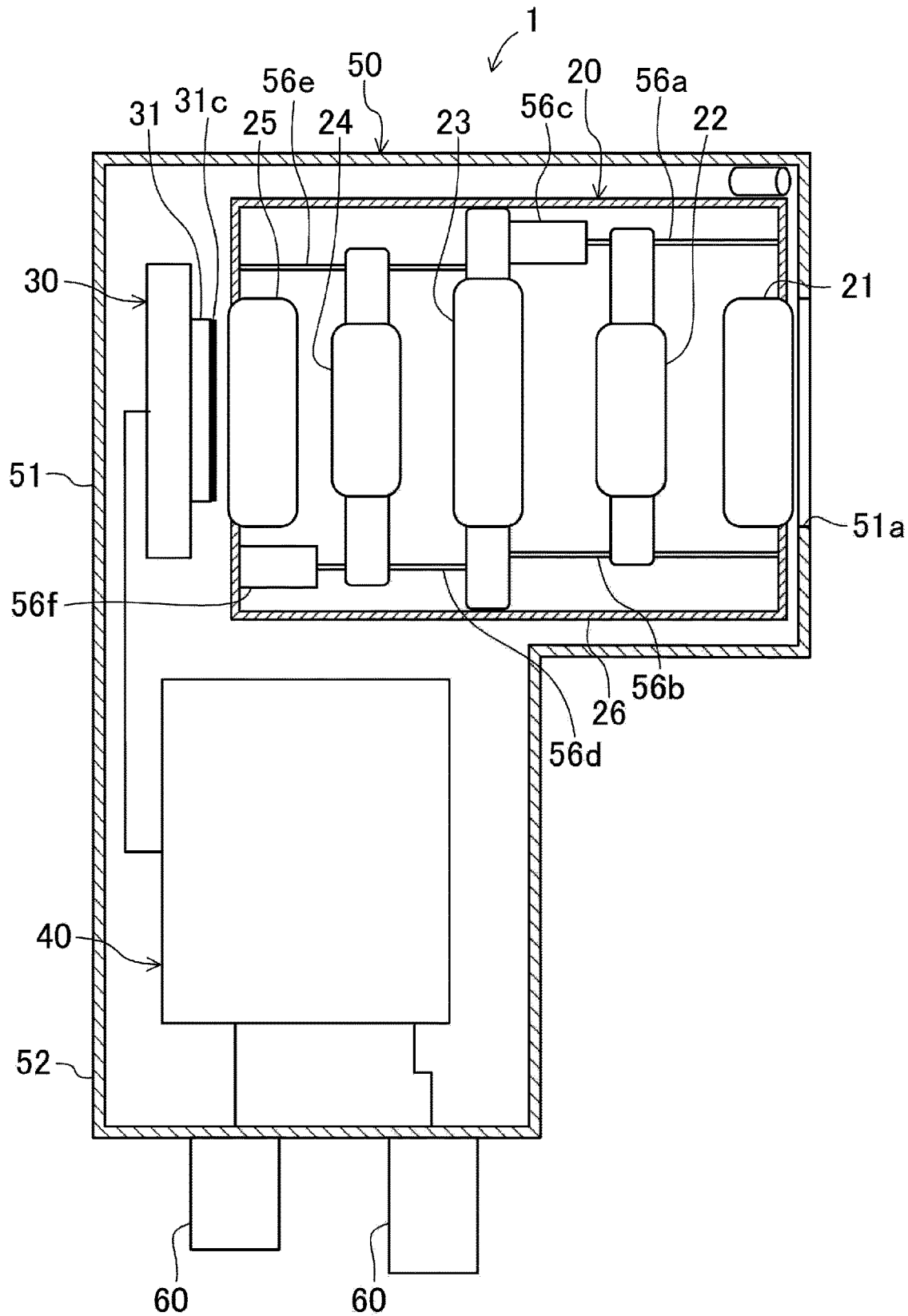
FIG. 6 is a cross-sectional view illustrating an internal structure of the industrial camera.

As illustrated in FIG. 6, the industrial camera 1 includes a lens unit 20, a sensor board 30, a main board 40, a housing 50, and a storage unit 39. The storage unit 39 stores setting information, various images, and the like of the industrial camera 1.

The housing 50 is made of a highly rigid member such as an aluminum alloy. Note that, for the sake of convenience in description, an upper-lower direction, a left-right direction, and a front-rear direction are defined as illustrated in FIGS. 2 to 5, but the directions do not limit the posture during use, and the industrial camera 1 can be used in any posture.

Figure 2:
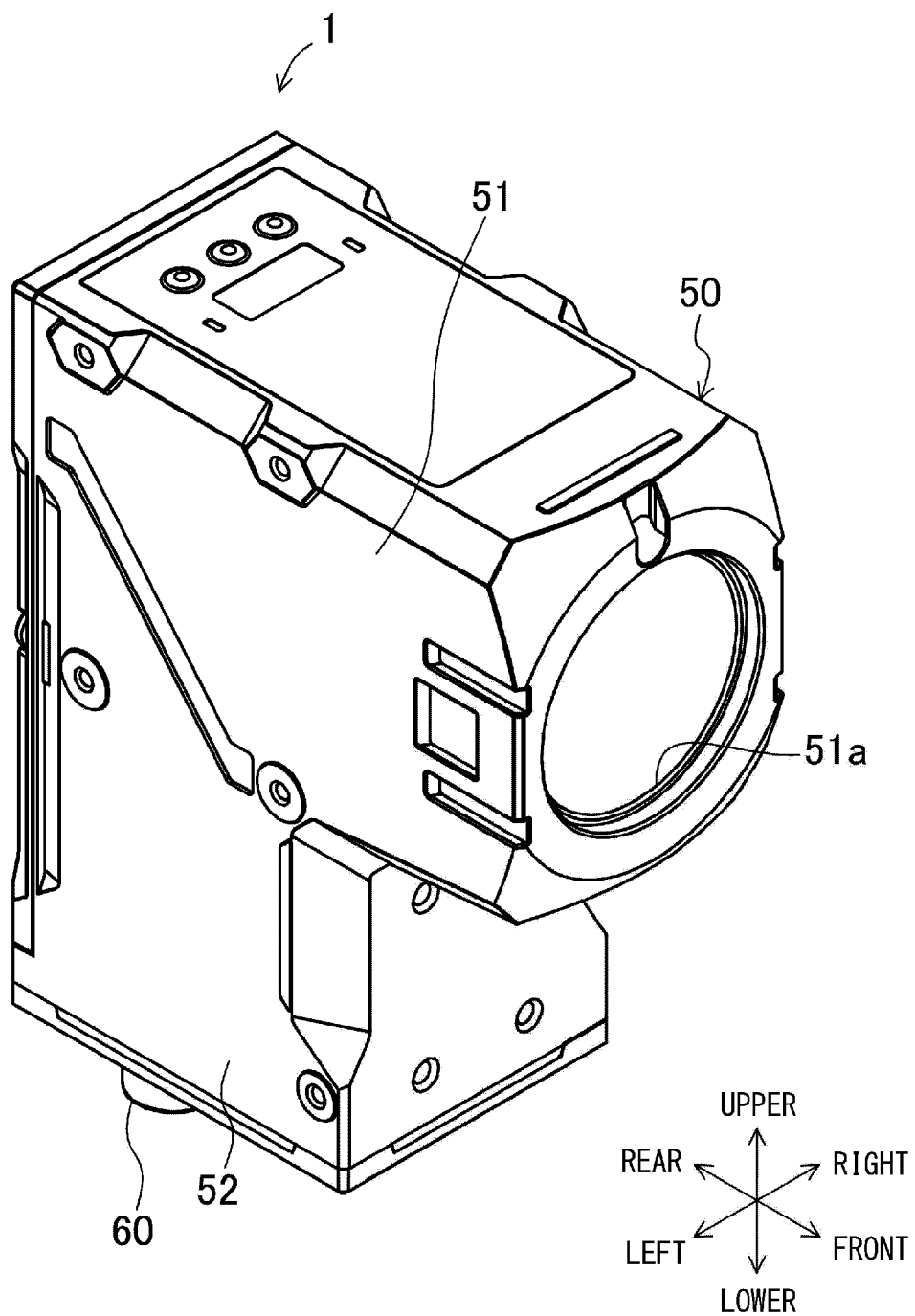
FIG. 2 is a perspective view of the industrial camera as viewed from above.
Figure 3:
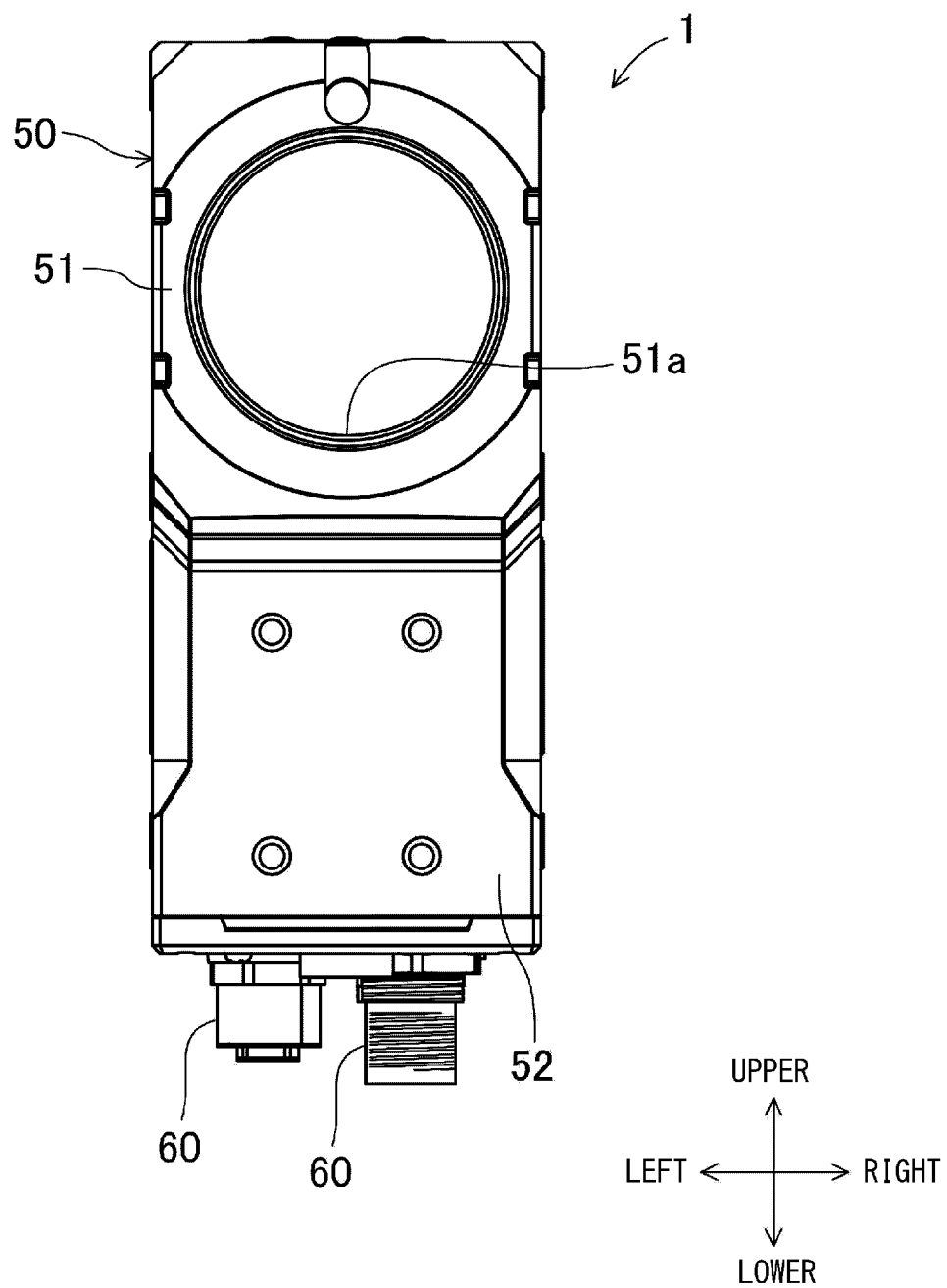
FIG. 3 is a front view of the industrial camera.
Figure 4:
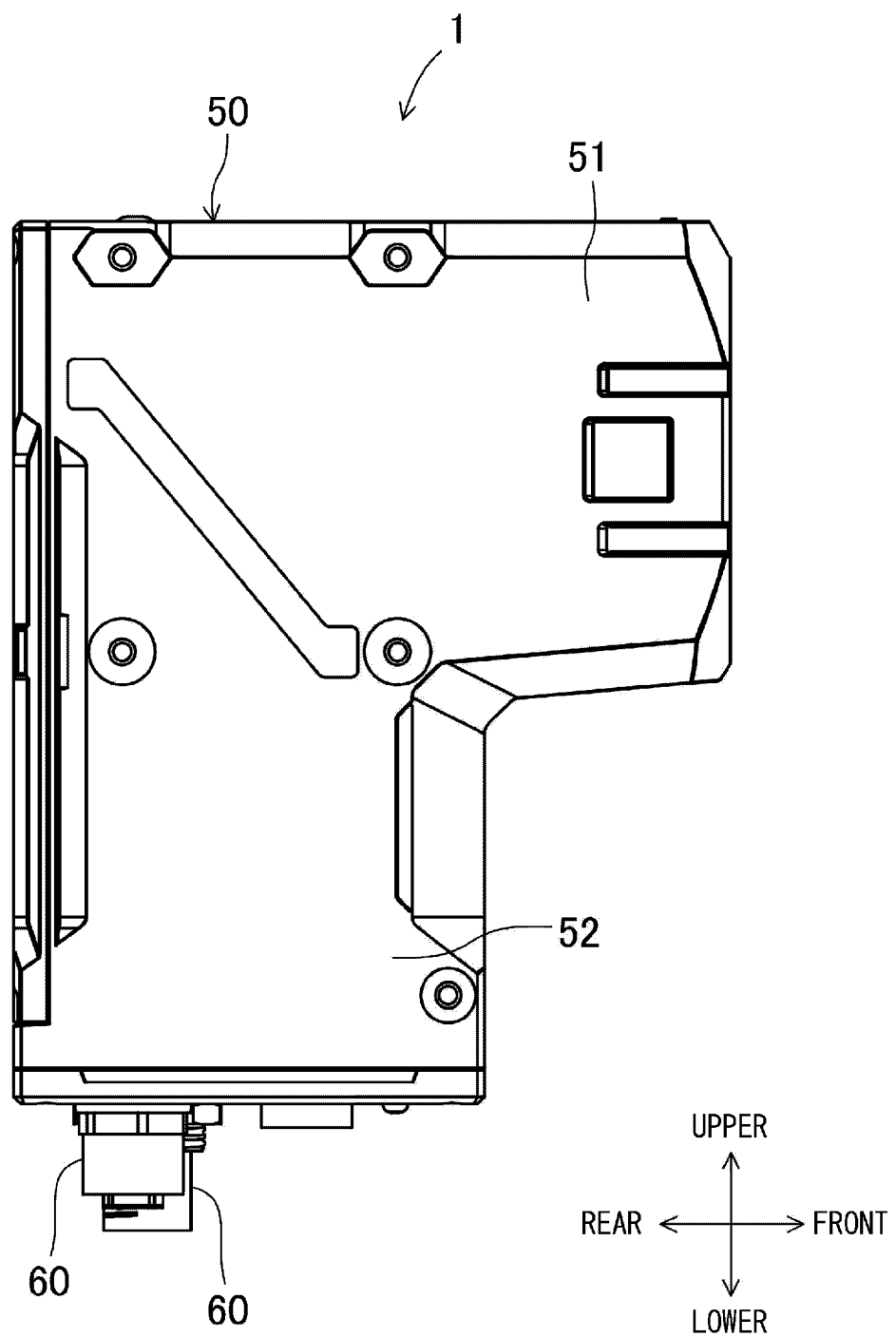
FIG. 4 is a side view of the industrial camera.
Figure 5:
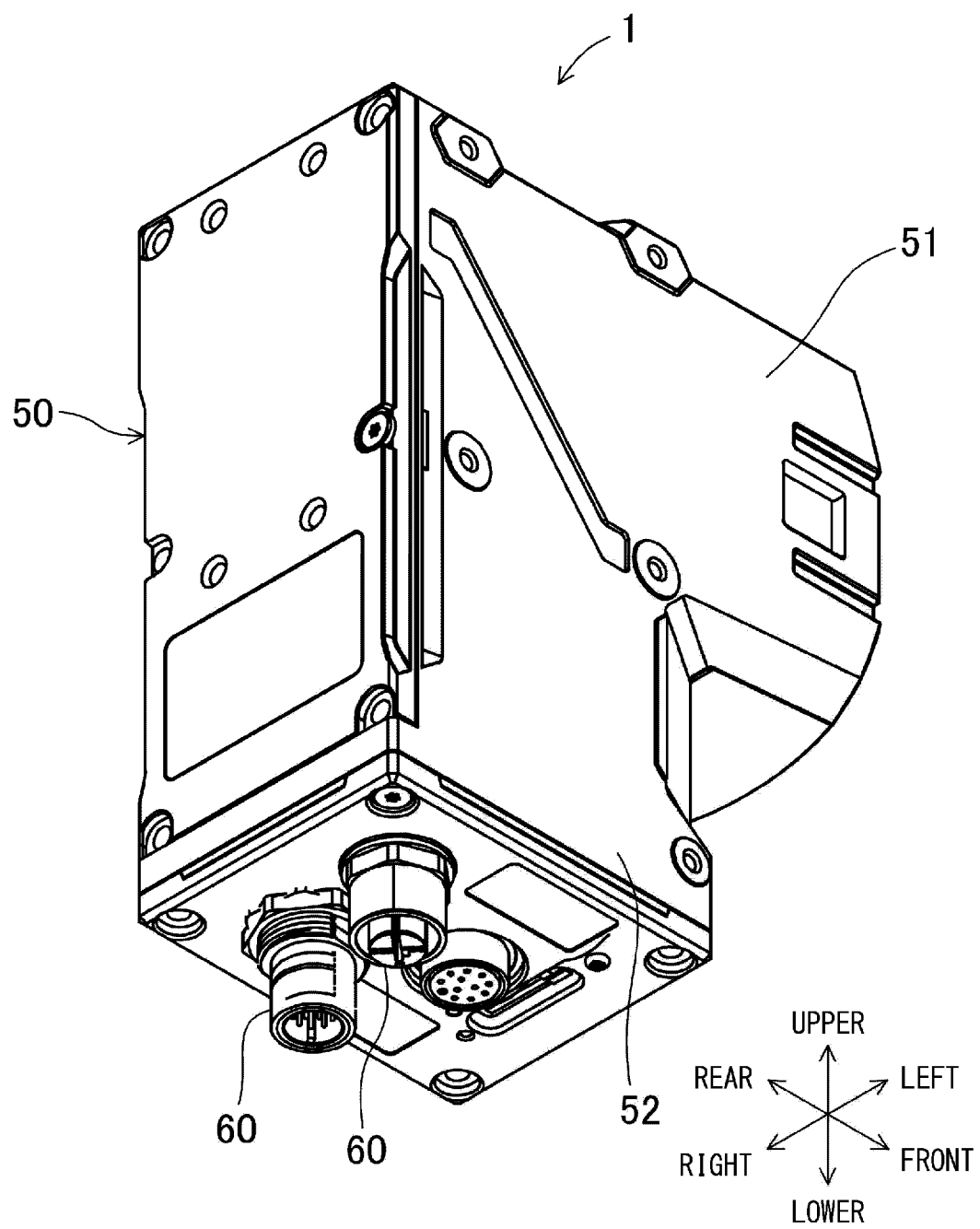
FIG. 5 is a perspective view of the industrial camera as viewed from below.

The housing 50 has an upper portion 51 and a lower portion 52. The upper portion 51 is formed to be longer in the front-rear direction than the lower portion 52. The lower portion 52 is formed to protrude downward from a rear side of the upper portion 51. As illustrated in FIGS. 2 and 3, a light receiving window 51a is formed on a front surface of the upper portion 51. In addition, as illustrated in FIG. 6, the lens unit 20 and the sensor board 30 are accommodated in the upper portion 51, and the main board 40 is accommodated in the lower portion 52. That is, the housing 50 incorporates an image sensor 31, a processor 41, and an output unit 42 to be described later.

The lens unit 20 is a zoom lens including a zoom optical system capable of electrically performing optical zooming, and can switch an optical zoom magnification to an any magnification as long as the optical zoom magnification is within a predetermined range. The lens unit 20 is fixed to the housing 50 and is integrated with the housing 50.

That is, an optical axis of the lens unit 20 coincides with the front-rear direction of the housing 50. The lens unit 20 includes a first lens group 21, a second lens group 22, a third lens group 23, a fourth lens group 24, a fifth lens group 25, and a lens barrel 26 that holds the first to fifth lens groups 21 to 25. The first to fifth lens groups 21 to 25 constitute condensing lenses that concentrate light incident from the light receiving window 51a. In addition, the number of lenses constituting each lens group of the first to fifth lens groups 21 to 25 is not particularly limited, and may be any number, and the number of lens groups may be 4 or less, or 6 or more. In addition, the lens unit 20 may be a zoom optical system capable of manually performing optical zooming.

The first lens group 21 is a fixed lens group disposed on a front surface of housing 50, and receives reflected light from the workpiece W. The first lens group 21 faces an outside of the housing 50 from the light receiving window 51a. The second lens group 22 is a zooming movable lens group disposed behind the first lens group 21, and receives light emitted from the first lens group 21. The third lens group 23 is a fixed lens group disposed behind the second lens group 22, and receives light emitted from the second lens group 22. The fourth lens group 24 is a focusing movable lens group disposed behind the third lens group 23, and receives light emitted from the third lens group 23. The fifth lens group 25 is a fixed lens group disposed behind the fourth lens group 24, and receives light emitted from the fourth lens group 24.

A zooming ball screw 56a, a zooming guide shaft 56b, and a zooming motor 56c that rotates the zooming ball screw 56a in a forward-reverse direction are provided in the lens barrel 26. The second lens group 22 is supported by the zooming ball screw 56a and the zooming guide shaft 56b, and when the zooming ball screw 56a is rotated by the zooming motor 56c, the second lens group 22 moves in an optical axis direction. As a result, a desired zoom magnification is obtained. The zooming ball screw 56a, the zooming guide shaft 56b, and the zooming motor 56c are zooming lens drive mechanisms that drive the second lens group 22 in the optical axis direction and adjust an optical magnification.

In addition, a focusing ball screw 56d, a focusing guide shaft 56e, and a focusing motor 56f that rotates the focusing ball screw 56d in the forward-reverse direction are provided in the lens barrel 26. The fourth lens group 24 is supported by the focusing ball screw 56d and the focusing guide shaft 56e, and when the focusing ball screw 56d is rotated by the focusing motor 56f, the fourth lens group 24 moves in the optical axis direction. As a result, focus adjustment is performed. The focusing ball screw 56d, the focusing guide shaft 56e, and the focusing motor 56f are zooming lens drive mechanisms that drive the fourth lens group 24 in the optical axis direction and adjust a focal position.

Figure 7:
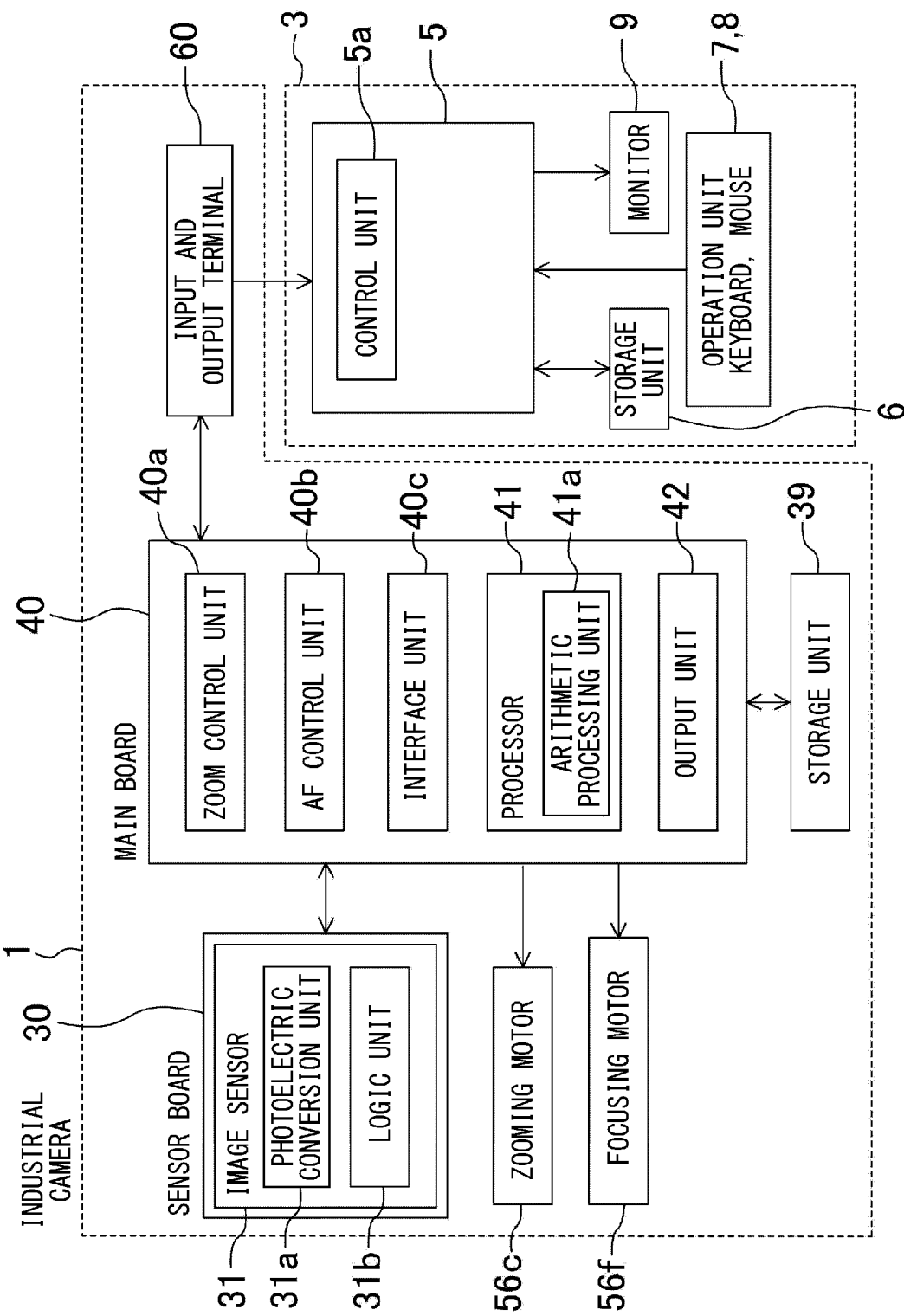
FIG. 7 is a block diagram of an image inspection system.

As illustrated in FIG. 7, a zoom control unit 40a, an AF control unit 40b, and an interface unit 40c are provided in the main board 40. The interface unit 40c is, for example, a portion that receives a zoom instruction or the like from the outside. In a case where the interface unit 40c receives a zoom instruction for optical zooming, the zoom control unit 40a controls the zooming motor 56c to move the second lens group 22 in the optical axis direction such that the zoom magnification received by the interface unit 40c is obtained.

The AF control unit 40b is a portion that executes autofocus control of a known contrast type or a phase difference type of the related art. The AF control unit 40b controls the focusing motor 56f to move the fourth lens group 24 in the optical axis direction such that the focal position matches the workpiece W.

As illustrated in FIG. 6, the sensor board 30 is disposed behind the fifth lens group 25. The image sensor 31 as an imaging unit is mounted on the sensor board 30. As illustrated in FIG. 7, the image sensor 31 includes a photoelectric conversion unit 31a that receives the light concentrated by the condensing lens, a logic unit 31b that generates an inspection target image from a captured image acquired by the photoelectric conversion unit 31a, and a color filter 31c (illustrated in FIG. 6), and can generate a color inspection target image obtained by capturing an inspection object. The photoelectric conversion unit 31a and the color filter 31c can generate the color captured image in which colors are formed in a predetermined array pattern. In addition, a monochrome captured image can be generated by the photoelectric conversion unit 31a. The following description is applicable to both the monochrome captured image and the color captured image.

The photoelectric conversion unit 31a can generate a captured image having a larger number of pixels than the inspection target image. In addition, the logic unit 31b is mounted on the same chip as the photoelectric conversion unit 31a, and is a portion constituting an image generation unit. Specifically, the photoelectric conversion unit 31a is a CMOS imaging element, is formed by stacking a plurality of wafers, and the logic unit 31b is formed by a part of the wafer. A part of the wafer may include a memory or the like.

The photoelectric conversion unit 31a can generate a captured image having a larger number of pixels than the inspection target image. In addition, the logic unit 31b is mounted on the same chip as the photoelectric conversion unit 31a, and is a portion constituting an image generation unit. Specifically, the photoelectric conversion unit 31a is a CMOS imaging element, is formed by stacking a plurality of wafers, and the logic unit 31b is formed by a part of the wafer. A part of the wafer may include a memory or the like.

In addition, the photoelectric conversion unit 31a is a global shutter type or rolling shutter type CMOS imaging element. In the case of the global shutter type, it is possible to capture an image without distortion even for a moving object. In the case of the rolling shutter type, since it is possible to realize a high pixel with a pixel pitch about half of a pixel pitch in the case of the global shutter type, it is possible to downsize each lens size of the lens unit 20. Eventually, it is possible to downsize the housing 50, and a degree of freedom during installation is improved. A field of view range of the image sensor 31 is formed by a pixel group of the photoelectric conversion unit 31a. The field of view range of the image sensor 31 is also referred to as a field of view range of the photoelectric conversion unit 31a.

The logic unit 31b is a portion that generates an inspection target image having a smaller number of pixels than the captured image by executing downscaling on the captured image corresponding to an output region that is a region of the pixel group (field of view range of the image sensor 31) of the photoelectric conversion unit 31a in whole or part and outputs the inspection target image. Here, the downscaling refers to processing of lowering a pixel resolution of a target image.

Figure 8:
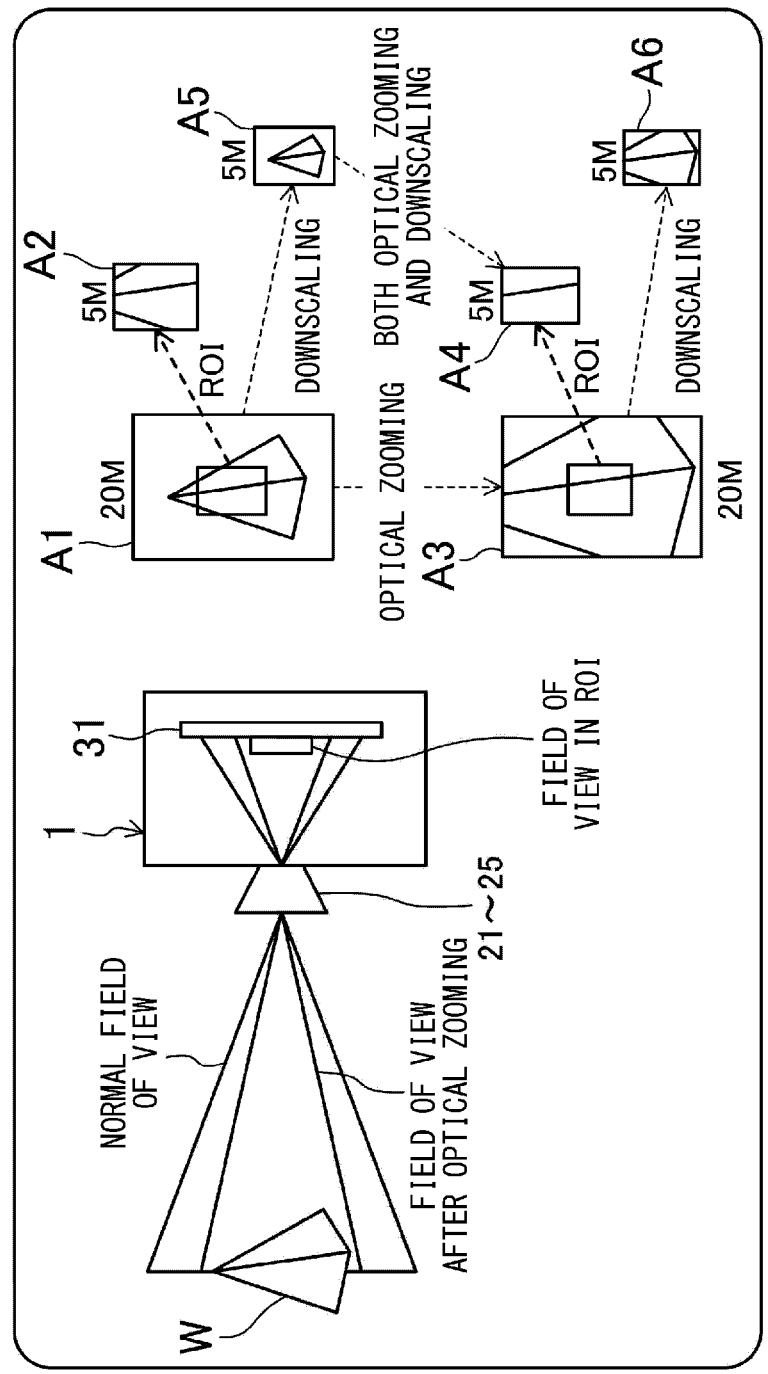
FIG. 8 is a diagram for describing a concept of downscaling.

The concept of the downscaling will be described with reference to FIG. 8. FIG. 8 schematically illustrates a case where an image of the workpiece W is captured by the industrial camera 1. For example, the number of pixels of the photoelectric conversion unit 31a is 20 megapixels (MP) (simply denoted as 20 M or the like in the drawings). As illustrated on a left side of FIG. 8, a field of view becomes narrower than a normal field of view by performing the optical zooming, and a region of interest (ROI) becomes a region narrower than the field of view after the optical zooming. As illustrated on a right side of FIG. 8, in a case where a region of interest is cut out from a captured image A1 captured with the number of pixels of 20 MP, for example, the region of interest is a region of interest A2 with 5 MP with the pixel resolution unchanged. Similarly, in a case where a region of interest is cut out from a captured image A3 after the optical zooming, the region of interest is a region of interest A4 with the number of pixels of 5 MP with the pixel resolution unchanged.

When downscaling is performed from the captured image A1, a scaling magnification (also referred to as a downscaling magnification) can be randomly set. The scaling magnification can be obtained by dividing the number of imaging pixels by the number of output pixels, and for example, in a case where an image having the same field of view as an image captured with 20 MP is output with 10 MP, the scaling magnification becomes 2 times.

The downscaling can be performed while an aspect ratio of the image remains constant, or can be performed while the aspect ratio of the image is changed. In a case where the aspect ratio of the image remains constant, as described above, for example, in a case where the image having the same field of view as the image captured with 20 MP is output with 10 MP, the scaling magnification becomes 2 times. On the other hand, in a case where the aspect ratio of the image is changed, for example, when the image captured with the number of pixels of 20 MP of 5000×4000 is output with the number of pixels of 5 MP of 2500×2000 with the same field of view, the scaling magnification becomes 4 times. In addition, in a case where a region of interest of 3200×4000 is downscaled to 2000×2500, the scaling magnification becomes 2.56 times.

In a case where the scaling magnification is set to, for example, 4 times while the aspect ratio of the image remains constant, an entire workpiece image A5 having the number of pixels of 5 MP is obtained. Both the optical zooming and the downscaling are performed for the image A5, and thus, the region of interest A4 having a higher pixel resolution than a pixel resolution of the image A5 is obtained. In addition, a workpiece image A6 with a pixel resolution lower than a pixel resolution of the image A3 is obtained by downscaling the captured image A3 after the optical zooming.

Figure 9:
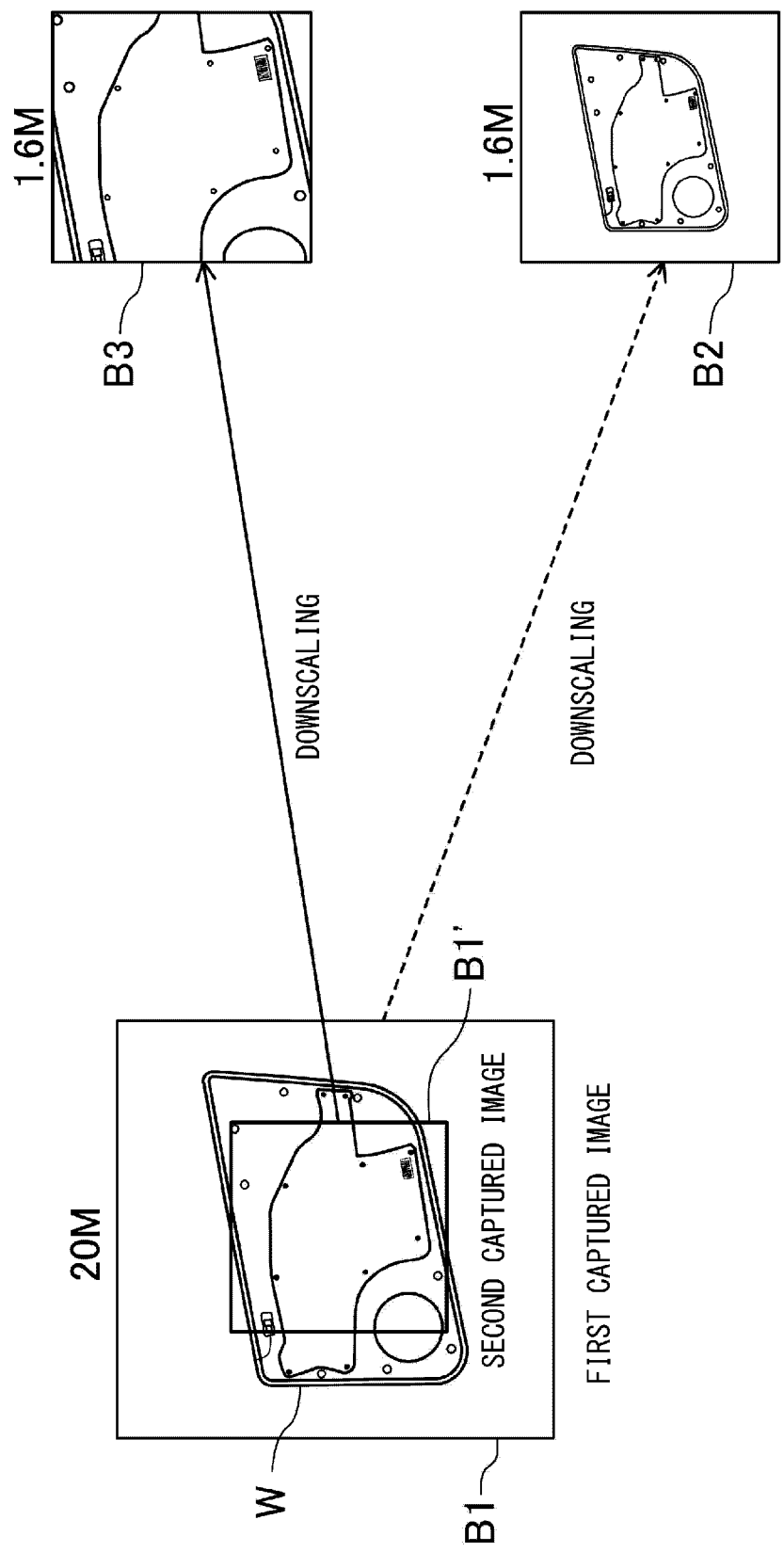
FIG. 9 is a diagram for describing a case where downscaling is performed based on a specific image obtained by capturing a workpiece.

FIG. 9 is a diagram for describing downscaling based on a specific image obtained by capturing the image of the workpiece W. A captured image corresponding to an output region that is a region of the entire pixel group of the photoelectric conversion unit 31a, that is, the entire field of view range of the imaging unit is set as a first captured image B1. The logic unit 31b downscales the first captured image B1 at any first scaling magnification to generate an inspection target image B2 with a first number of pixels (for example, 1.6 MP) smaller than the number of pixels (for example, 20 MP) of the first captured image B1.

The interface unit 40c can receive designation of an output region that is a region to be output as the inspection target image in the field of view range of the photoelectric conversion unit 31a, that is, the imaging unit. This output region may be, for example, a region corresponding to the region of interest described with reference to FIG. 8. The interface unit 40c can also receive an instruction to change at least one of a position, a size, and a shape of the output region.

For example, the interface unit 40c is configured to be able to receive a first zoom instruction to change the output region of the photoelectric conversion unit 31a to a relatively small region from a user. Specifically, in response to the first zoom instruction, the output region is changed to a part of the pixel group of the photoelectric conversion unit 31a, that is, a part of the field of view range of the imaging unit. A second captured image B1' is a captured image corresponding to an output region changed in response to the first zoom instruction. The second captured image B1' is captured at a timing different from a timing of the first captured image B1, and is independent of the first captured image B1. The logic unit 31b downscales the second captured image B1' at a second scaling magnification to generate an inspection target image B3 with the first number of pixels (for example, 1.6 MP) smaller than the number of pixels (for example, 5 MP) of the second captured image B1'. In addition, the second captured image B1' may be generated based on the first captured image B1, and may be generated by cutting out, for example, a part of the first captured image B1. In addition, the interface unit 40c is configured to be able to receive an instruction to adjust the first zoom magnification not only with an integer but also with accuracy after a decimal point.

As illustrated in FIG. 7, the processor 41 that executes various kinds of arithmetic processing and controls the image sensor 31 are provided in the main board 40. The processor 41 includes a calculation unit 41a, and the processor 41 controls the logic unit 31b of the image sensor 31 based on a result arithmetic-processed by the calculation unit 41a and causes the logic unit 31b to generate a desired inspection target image.

The calculation unit 41a calculates the second scaling magnification necessary for setting the second captured image B1' corresponding to the output region after the change in the field of view range of the photoelectric conversion unit 31a to have the first number of pixels. The calculation unit 41a outputs the calculated second scaling magnification to the logic unit 31b. The logic unit 31b generates the inspection target image B3 having the first number of pixels by downscaling the second captured image B1' at the second scaling magnification calculated by the calculation unit 41a. The inspection target image B3 having the first number of pixels has a lower resolution than the first captured image B1 corresponding to the output region of the photoelectric conversion unit 31a, but has a resolution enough to ensure necessary inspection accuracy. Thus, there is no problem in inspection accuracy.

The calculation unit 41a performs arithmetic processing such that the second scaling magnification decreases as the first zoom magnification received by the interface unit 40c increases. The logic unit 31b decreases a downscaling amount for the second captured image B1' as the second scaling magnification arithmetic-processed by the calculation unit 41a decreases. As a result, the logic unit 31b generates an inspection target image with high pixel resolution.

The calculation unit 41a calculates a ratio of how many pixels of the second captured image B1' one pixel of the inspection target image B3 having the first number of pixels corresponds to, based on the first zoom magnification received by the interface unit 40c. The calculation unit 41a calculates the second scaling magnification by using this ratio.

In a case where the interface unit 40c receives an instruction to adjust the first zoom magnification with accuracy after a decimal point, the calculation unit 41a calculates a ratio of how many pixels of the second captured image B1' one pixel of the inspection target image B3 corresponds to, up to the decimal point with accuracy after the decimal point, based on the zoom magnification for which the adjustment instruction is received. As a result, the calculation unit 41a calculates the second scaling magnification with accuracy after the decimal point. The logic unit 31b generates the inspection target image based on the second scaling magnification calculated with accuracy after the decimal point.

Figure 10:
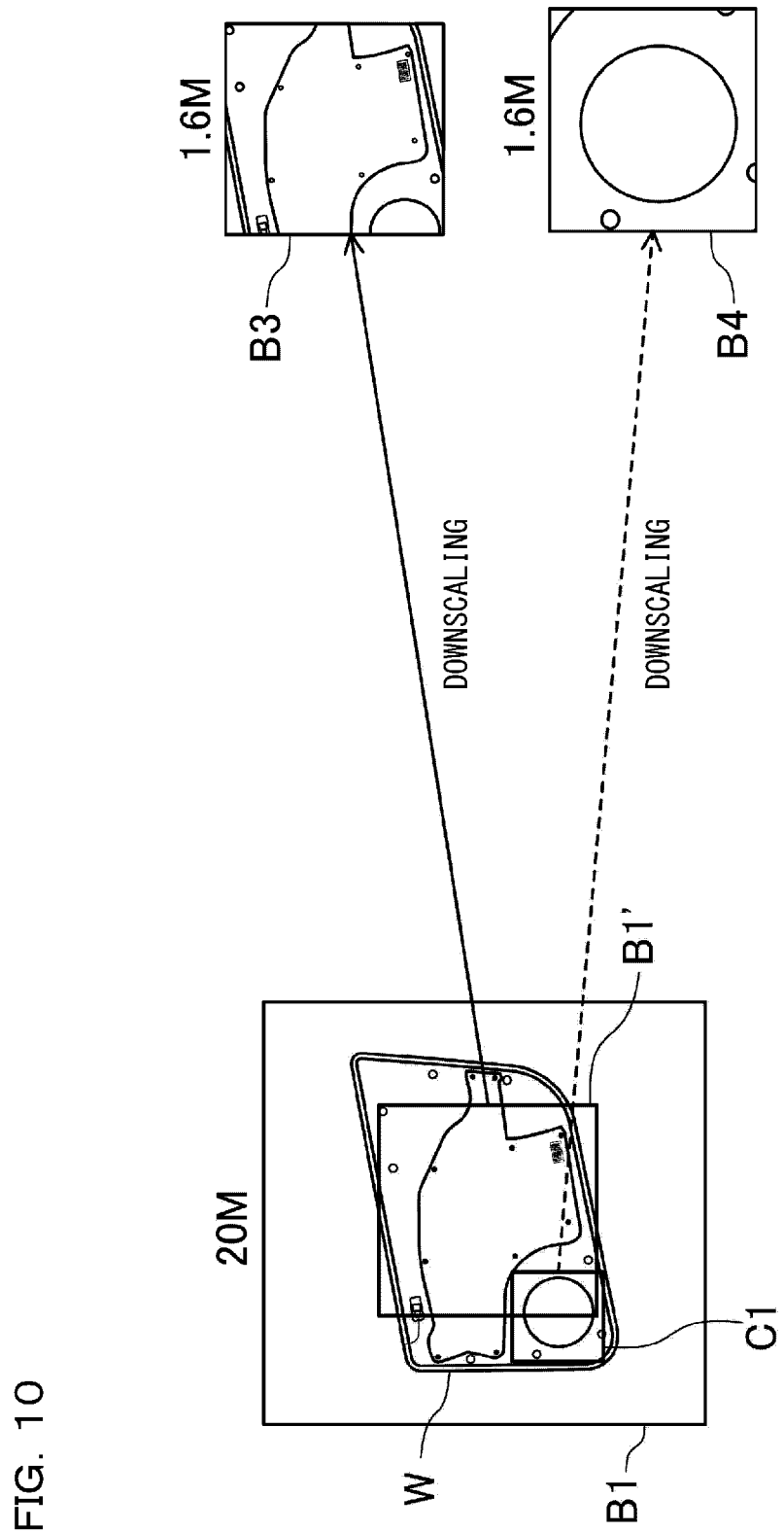
FIG. 10 is a diagram for describing a case where downscaling is performed based on a zoom instruction at any position.

FIG. 10 is a diagram for describing a case where downscaling is performed based on a zoom instruction at any position. The interface unit 40c is configured to be able to receive, as the zoom instruction at any position of the inspection target image, the first zoom instruction to change the output region of the photoelectric conversion unit 31a to the relatively small region. Specifically, for the sake of convenience in description, a frame C1 in the captured image B1 in FIG. 10 indicates a position and a region where the zoom instruction is received within the field of view range of the imaging unit, and the user may designate the frame C1 for the inspection target image B2 via the mouse 8 or the like while the monitor 9 on which the inspection target image B2 obtained by downscaling the entire captured image B1 in FIG. 9 is displayed is confirmed. The position of the frame C1 may be disposed at any position in the inspection target image B2 (that is, the field of view range of the imaging unit), and the interface unit 40c detects the disposed position. In addition, a size and a shape of the frame C1 can also be randomly set by the user.

When the zoom instruction in which the frame C1 is designated as any position by the interface unit 40c is received, the logic unit 31b performs downscaling at the scaling magnification necessary for setting the region (that is, the captured image corresponding to the frame C1, and has the number of pixels larger than 1.6 MP) corresponding to the output region including any position to 1.6 MP within the field of view range of the imaging unit. As a result, the logic unit 31b generates an inspection target image B4 including any position. The position of the frame C1 may be shifted in an X direction (horizontal direction of the image) or a Y direction (vertical direction of the image) from a center of the field of view range of the imaging unit, and a region at a position shifted from the center of the field of view range of the imaging unit, that is, the optical axis can be downscaled. That is, zooming is performed along the center of the optical axis in general optical zooming, but in the downscaling of the present example, zooming can be performed in not only the center of the optical axis but also the region shifted from the center of the optical axis, and a degree of freedom in position setting of a region that can be downscaled is high.

Figure 11:
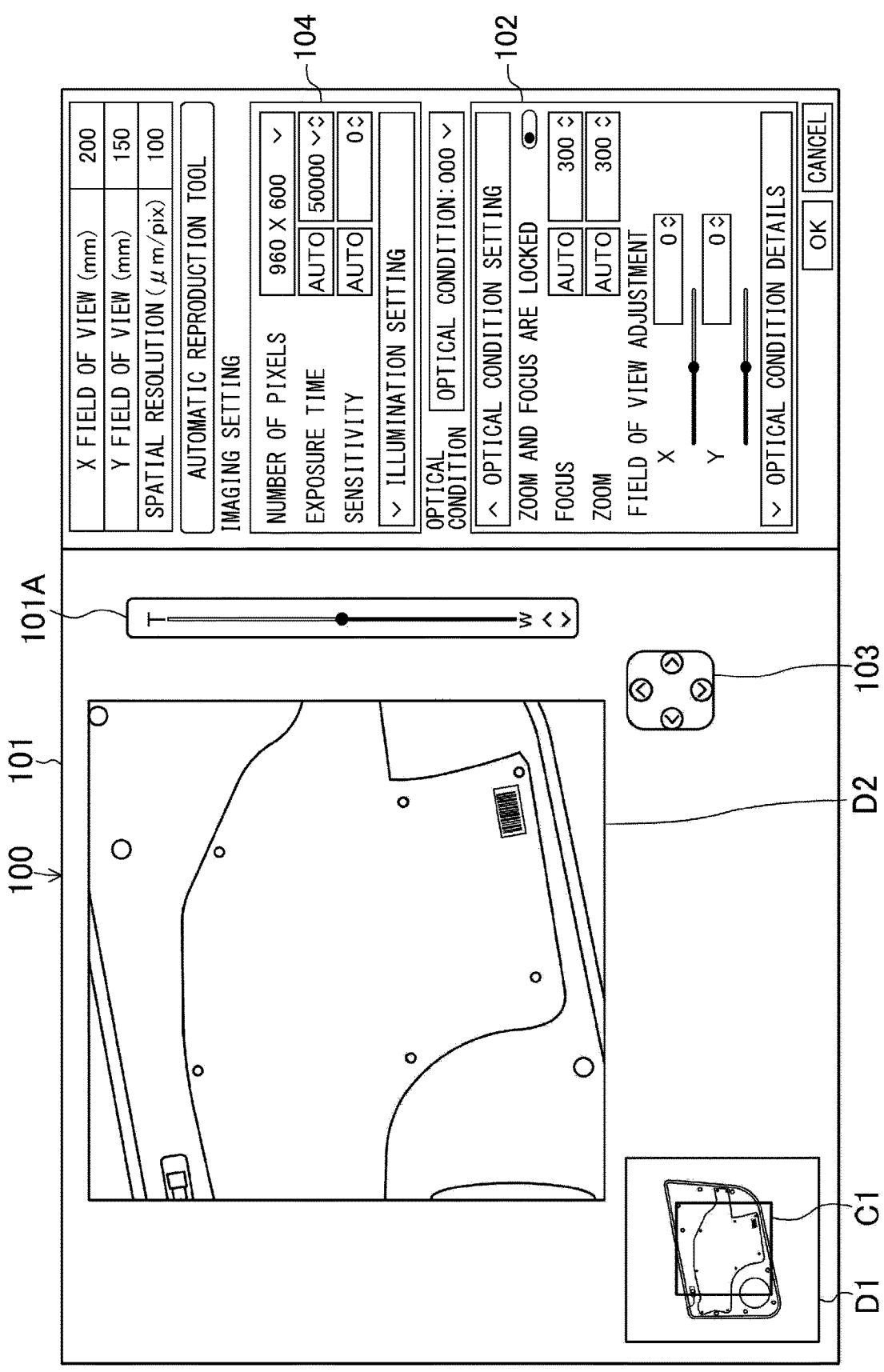

FIG. 11 illustrates a user interface screen 100 for setting in which the zoom instruction can be received. The user interface screen 100 is generated by the control unit 5a of the controller 3 and is displayed on the monitor 9. On the user interface screen 100, an operation using the keyboard 7 or the mouse 8 can be performed, and the control unit 5a detects and stores which operation is performed.

An image display region 101 is provided in the user interface screen 100. A bird's-eye view image D1 in which a position of the output region in the entire field of view range of the photoelectric conversion unit 31a and an inspection target image D2 corresponding to the output region is shown are displayed in the image display region 101. That is, the interface unit 40c of the industrial camera 1 illustrated in FIG. 7 is configured to be able to output, to the outside, the bird's-eye view image D1 in which the position of the output region in the entire field of view range of the photoelectric conversion unit 31a is shown and the inspection target image D2 corresponding to the output region. Specifically, the output unit 42 is provided in the main board 40. The output unit 42 is a portion that outputs the bird's-eye view image D1 and the inspection target image D2 output from the image sensor 31 to the outside. When the images are output, image data is transmitted from the industrial camera 1 to the controller 3 via, for example, an input and output terminal 60 and the cable 10.

A zoom adjustment region 101A in which the user adjusts the zoom magnification is provided on the user interface screen 100 illustrated in FIG. 11. The zoom adjustment region 101A is operated to a "T" side with the mouse 8, and thus, the field of view range is narrowed by zooming to a telephoto side. On the other hand, the zoom adjustment region is operated to a "W" side to conversely enlarge the field of view range. In addition, the zoom magnification can also be adjusted by operating a wheel of the mouse 8. The adjusted zoom magnification is temporarily stored on the controller 3 side, is transferred to the interface unit 40c of the industrial camera 1, and is received by the interface unit 40c.

The zoom magnification can be adjusted by a numerical value. That is, a numerical value input region 102 is provided on the user interface screen 100. The numerical value input region 102 is for the user to adjust the zoom magnification by inputting a numerical value, and a numerical value can be randomly input by the keyboard 7, the mouse 8, or the like.

Figure 12:
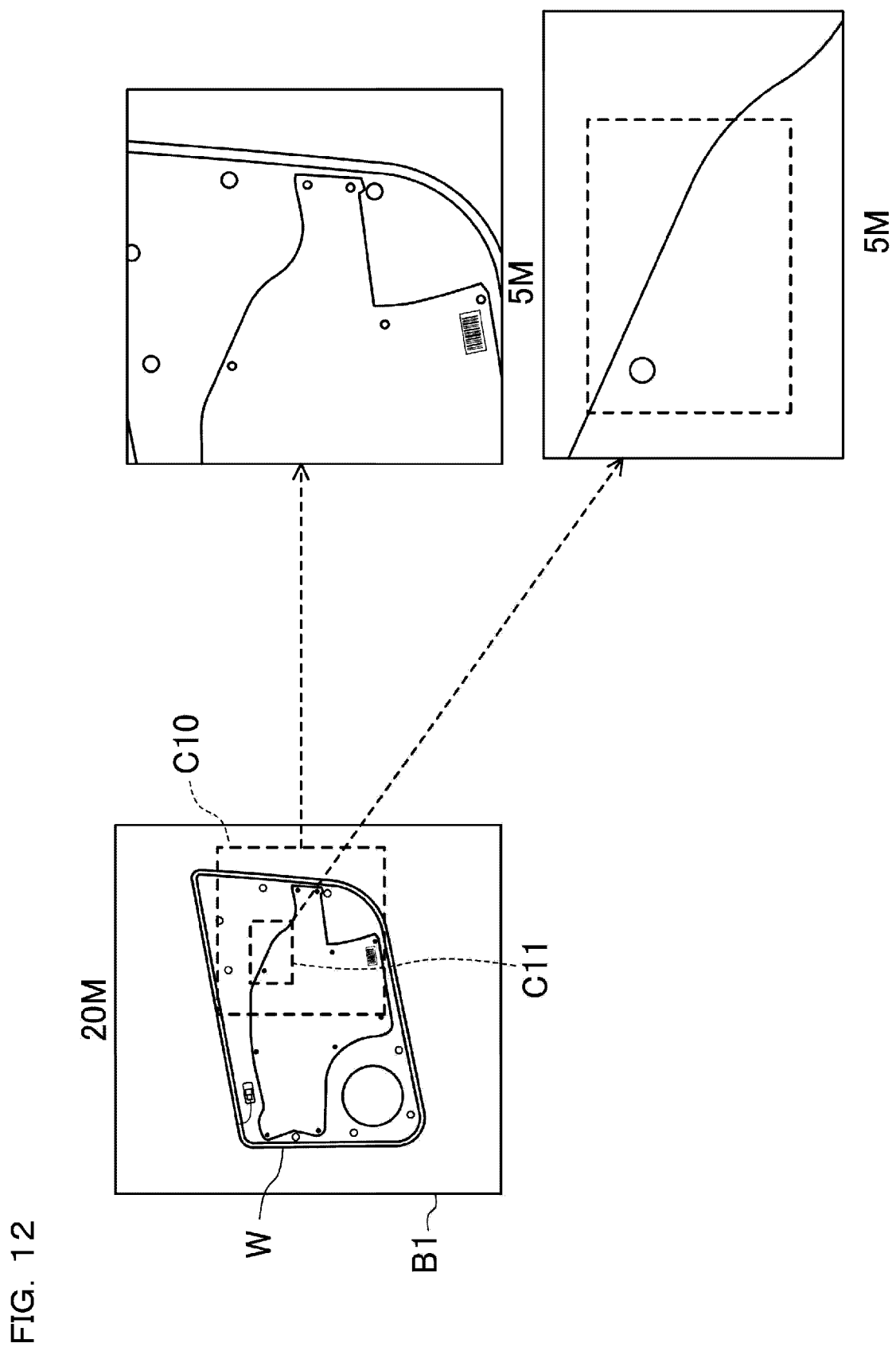
FIG. 12 is a diagram for describing a case where downscaling is performed based on a zoom instruction by region selection using a mouse.

FIG. 12 is a diagram for describing a case where downscaling is performed based on a zoom instruction by region selection using the mouse 8. A frame C10 is formed by an operation of the mouse 8, and can be formed, for example, by performing a dragging operation from an upper left to a lower right (or from an upper right to a lower left, or the like). The logic unit 31b generates the inspection target image with 5 MP by downscaling the captured image corresponding to the region surrounded by the frame C10. In addition, a frame C11 can be formed by the operation of the mouse 8, and the region in the frame C11 is enlarged. At this time, in a case where a region in the frame C11 in the captured image B1 is less than 5 MP and a size of the inspection target image to be output is 5 MP, since the region exceeds a maximum resolution (resolution of the captured image B1), the region with 5 MP including the frame C11 is downscaled (that is, is not substantially downscaled) at a scaling magnification of 1 time, and is output as the inspection target image.

Figure 13:
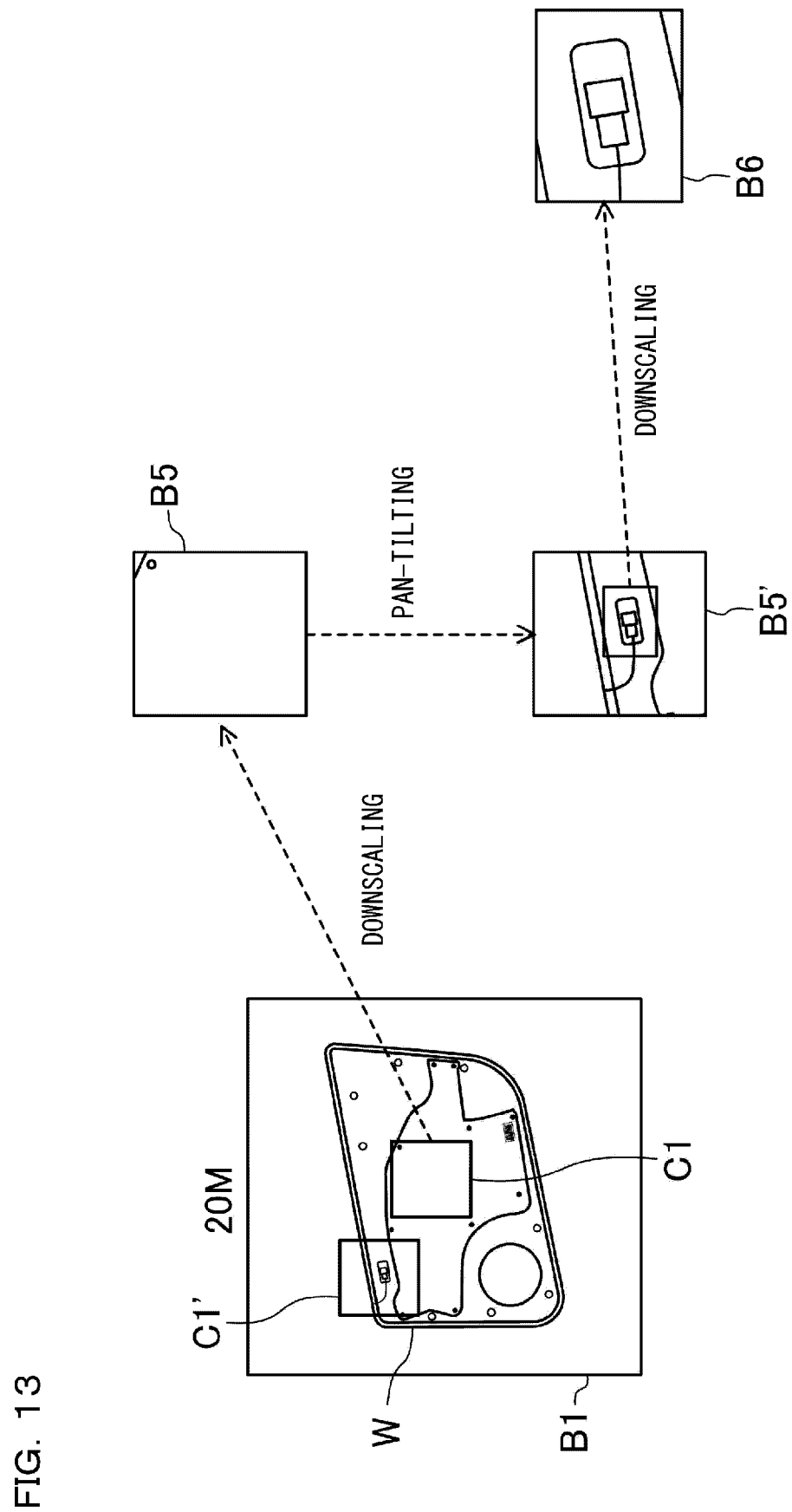
FIG. 13 is a diagram for describing a case where downscaling is performed after pan-tilting at any position.

FIG. 13 is a diagram for describing a case where downscaling is performed after any position is pan-tilted. The interface unit 40c is configured to be able to receive a first pan-tilt instruction for adjusting any position in the X direction and the Y direction. For example, after a center of the field of view range of the photoelectric conversion unit 31a is designated as the region of interest by the frame C1, the position of the frame C1 is moved in the X direction and the Y direction, and is disposed, for example, at a position indicated by reference numeral C1'. In a case where downscaling is performed in the frame C1, an inspection target image B5 is obtained. The logic unit 31b generates an inspection target image B5' of which a position in the X direction and the Y direction is adjusted by downscaling the captured image corresponding to any position (position of the frame C1') adjusted in the X direction and the Y direction. The logic unit 31b generates an inspection target image B6 by further downscaling a part of a region surrounded by the frame C1'.

The adjustment in the X direction and the Y direction can be performed by using the user interface screen 100 illustrated in FIG. 11. A field of view position adjustment region 103 is provided on the user interface screen 100. The field of view position adjustment region 103 is formed by combining arrows and the like directed in upper, lower, left, and right directions, and for example, when an upward arrow is operated, the position of the frame C1 moves upward. Similarly, the position of the frame C1 can be adjusted to any position in the lower, left, and right directions. The frame C1 may be directly dragged by the mouse 8.

Figure 14:
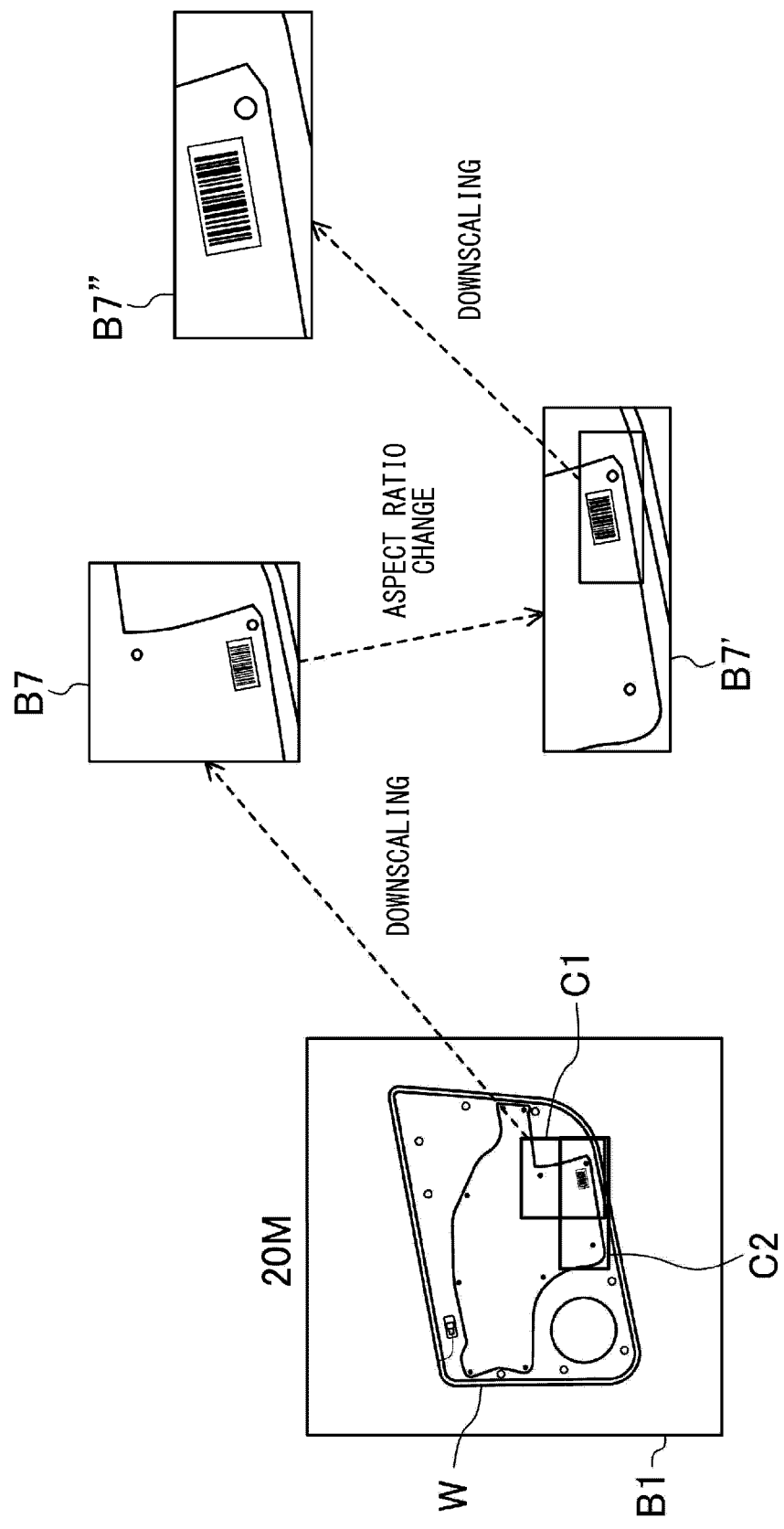
FIG. 14 is a diagram for describing a case where downscaling is performed in a state where an aspect ratio of an image is changed.

FIG. 14 is a diagram for describing a case where downscaling is performed in a state where the aspect ratio of the image is changed. The interface unit 40c is configured to be able to receive a change in the aspect ratio of the output region of the photoelectric conversion unit 31a. For example, as indicated by the frame C1, when the zoom instruction at any position within the field of view range of the imaging unit is received, the logic unit 31b generates an inspection target image B7 by downscaling the captured image corresponding to the frame C1. Thereafter, the user can freely designate the aspect ratio of the region specified by the frame C1. A region in which an aspect ratio is changed is indicated by a frame C2. The logic unit 31b generates an inspection target image B7' by downscaling the region corresponding to the output region (region surrounded by the frame C2) with the changed aspect ratio. An inspection target image B7'' is generated by further downscaling a part of a region surrounded by the frame C2.

Figure 15:
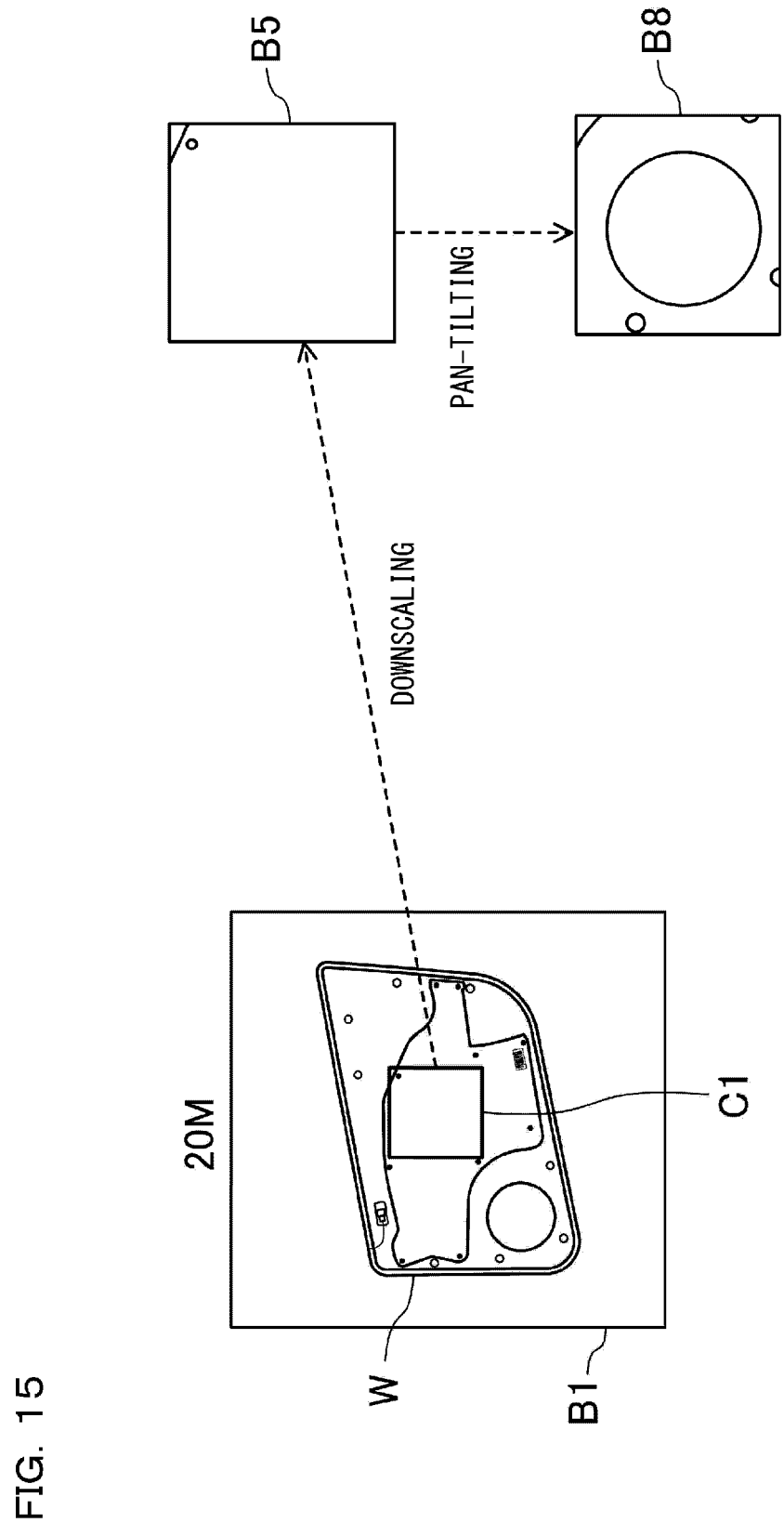
FIG. 15 is a diagram for describing a case where pan-tilting is performed after downscaling around a fixed point.

FIG. 15 is a diagram for describing a case where pan-tilting is performed after downscaling around a fixed point. For example, in a case where a center of a field of view of the photoelectric conversion unit 31a is set as a fixed point, the logic unit 31b generates the inspection target image B5 by downscaling the frame C1 including the center of the field of view range of the imaging unit, and then performs pan-tilting as illustrated in FIG. 13. Thus, the logic unit 31b generates an inspection target image B8 by downscaling the captured image corresponding to the pan-tilted region.

In addition, the interface unit 40c is configured to be able to receive a number-of-pixels change instruction to change the number of pixels of the inspection target image from the first number of pixels to the second number of pixels. The second number of pixels is the number of pixels larger than the first number of pixels. Specifically, a number-of-pixels setting region 104 is provided on the user interface screen 100 illustrated in FIG. 11. In the number-of-pixels setting region 104, the number of pixels of the inspection target image can be selected from among predetermined options in the form of a pull-down menu. The number of selectable pixels can be, for example, in a range of 1.6 MP or more and 5 MP or less, but is not limited thereto.

In addition, in the number-of-pixels setting region 104, an aspect ratio can also be selected. That is, a plurality of options, each of which is a combination of the number of pixels and the aspect ratio of the inspection target image, are displayed in the pull-down menu of the number-of-pixels setting region 104. The user can select any one option among the options. Information regarding the number of selected pixels is received by the interface unit 40*c* and is transmitted, as the number-of-pixels change instruction, to the processor 41 of the industrial camera 1.

When the processor 41 receives the number-of-pixels change instruction, the calculation unit 41*a* calculates a scaling magnification necessary for setting the captured image corresponding to the same output region as the output region before the number-of-pixels change instruction to have the second number of pixels within the field of view range of the photoelectric conversion unit 31*a*. The scaling magnification calculated by the calculation unit 41*a* is sent to the logic unit 31*b*, and the logic unit 31*b* generates the inspection target image having the second number of pixels by downscaling the captured image at the scaling magnification. In a case where the aspect ratio is changed, the logic unit 31*b* generates the inspection target image with the changed aspect ratio by downscaling the region corresponding to the output region with the changed aspect ratio within the field of view range of the photoelectric conversion unit 31*a*. That is, the logic unit 31*b* generates the inspection target image according to the combination of the number of pixels and the aspect ratio of the inspection target image selected in the number-of-pixels setting region 104.

Figure 16:
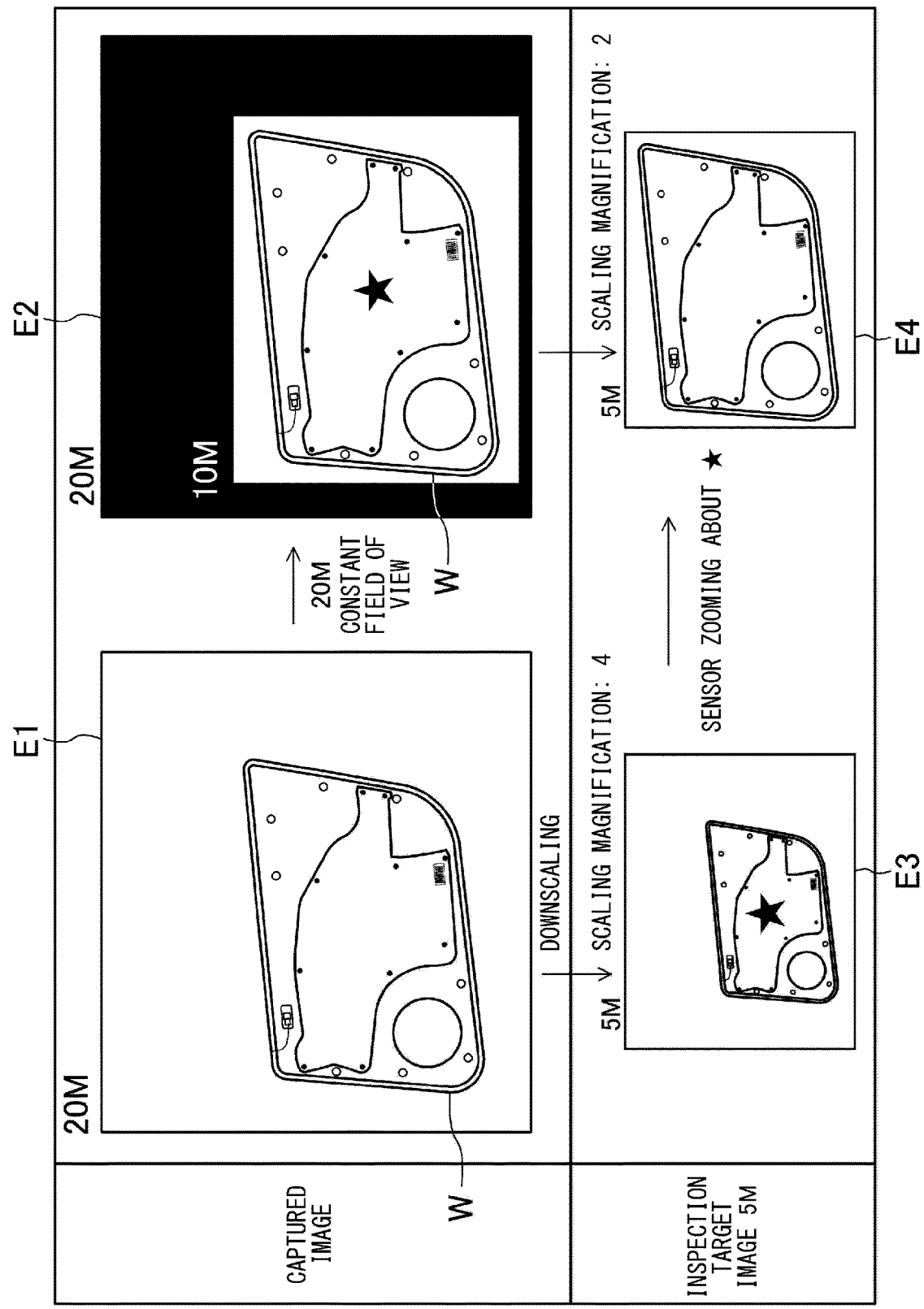
FIG. 16 is a diagram for describing a case of a zoom magnification capable of coping with only by downscaling.

FIG. 16 is a diagram for describing a case where the zoom magnification can cope with only by the downscaling, that is, a case where the optical zooming is unnecessary. An upper side of FIG. 16 shows captured images E1 and E2, and a lower side shows inspection target images E3 and E4. Since fields of view of the left captured image E1 and the right captured image E2 are constant and a signal of a black region where the workpiece W is not present is not read out in the right captured image E2, the number of pixels of the left captured image E1 is 20 MP, and the number of pixels of the right captured image E2 is 10 MP. When the left captured image E1 is downscaled at a scaling magnification of 4 times, the left inspection target image E3 is obtained. The left inspection target image E3 is an image obtained by outputting a region corresponding to the number of pixels of 20 MP pixels with the number of pixels of 5 MP. In addition, since the signal of the black region is not read out in the right captured image E2, it is possible to perform the downscaling at a scaling magnification of 2 times, and the right inspection target image E4 is obtained. The right inspection target image E4 is an image obtained by outputting a region corresponding to the number of pixels of 10 MP with the number of pixels of 5 MP. In addition, the right inspection target image E4 more finely divided is obtained by zooming a center of the left inspection target image E3.

That is, even though the optical zooming is not used, the inspection target image E4 in which the workpiece W is enlarged and displayed is obtained while a pixel resolution is higher than a pixel resolution of the inspection target image E3. In the present specification, this zoom processing may be referred to as "sensor zooming".

Figure 17:
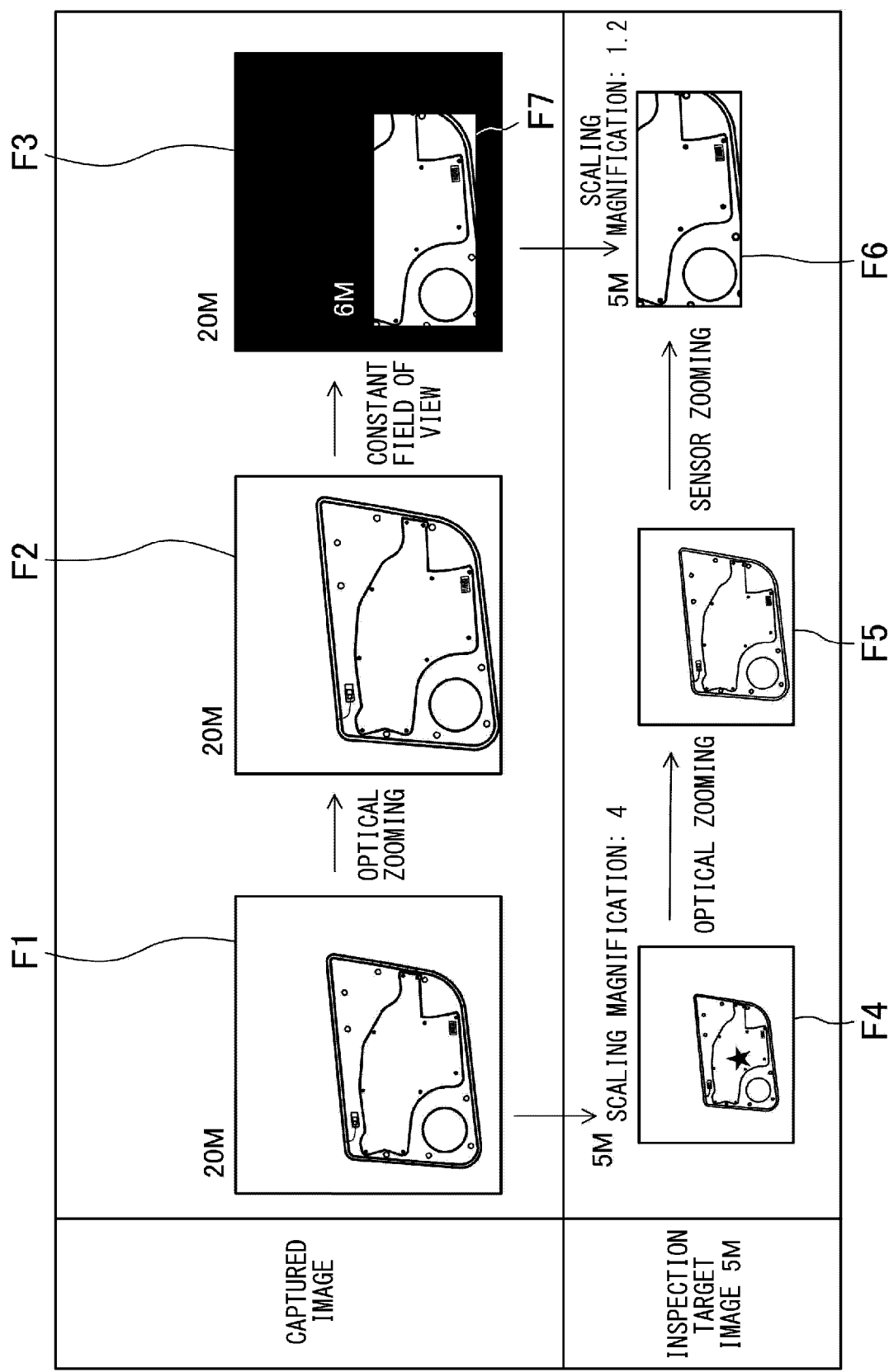
FIG. 17 is a diagram for describing a case of a zoom magnification capable of coping with downscaling and optical zooming.

FIG. 17 is a diagram for describing a case where the zoom magnification is equal to or more than a certain magnification and it is necessary to cope with both the downscaling and the optical zooming. An upper side of FIG. 17 shows a captured image F1, an optical zoom image F2, and a captured image F3, and a lower side shows inspection target images E4, E5, and E6. The optical zoom image F2 having a narrow field of view range is obtained by performing the optical zooming in a range in which the captured image F1 is generated. A signal of a black region where the workpiece W is not present is not read out in the right captured image F3. A portion surrounded by a frame F7 of the right captured image F3 is set as the region of interest. The number of pixels in the region of interest is 6 MP.

When the left captured image F1 is downscaled at a scaling magnification of 4 times, a left inspection target image F4 is obtained. Since a central inspection target image F5 is an image acquired by the optical zooming, the central inspection target image is zoomed along the center of the field of view of the photoelectric conversion unit 31*a*. Thus, when a center of the workpiece W is shifted from the center of the field of view of the photoelectric conversion unit 31*a*, the workpiece W is shifted from the center of the image in the image after the zooming. A pixel resolution of the central inspection target image F5 is improved. A right inspection target image F6 is an image obtained by downscaling the region of interest surrounded by the frame F7 of the right captured image F3 at a scaling magnification of 1.2 times, and the number of pixels is 5 MP.

Figure 18:
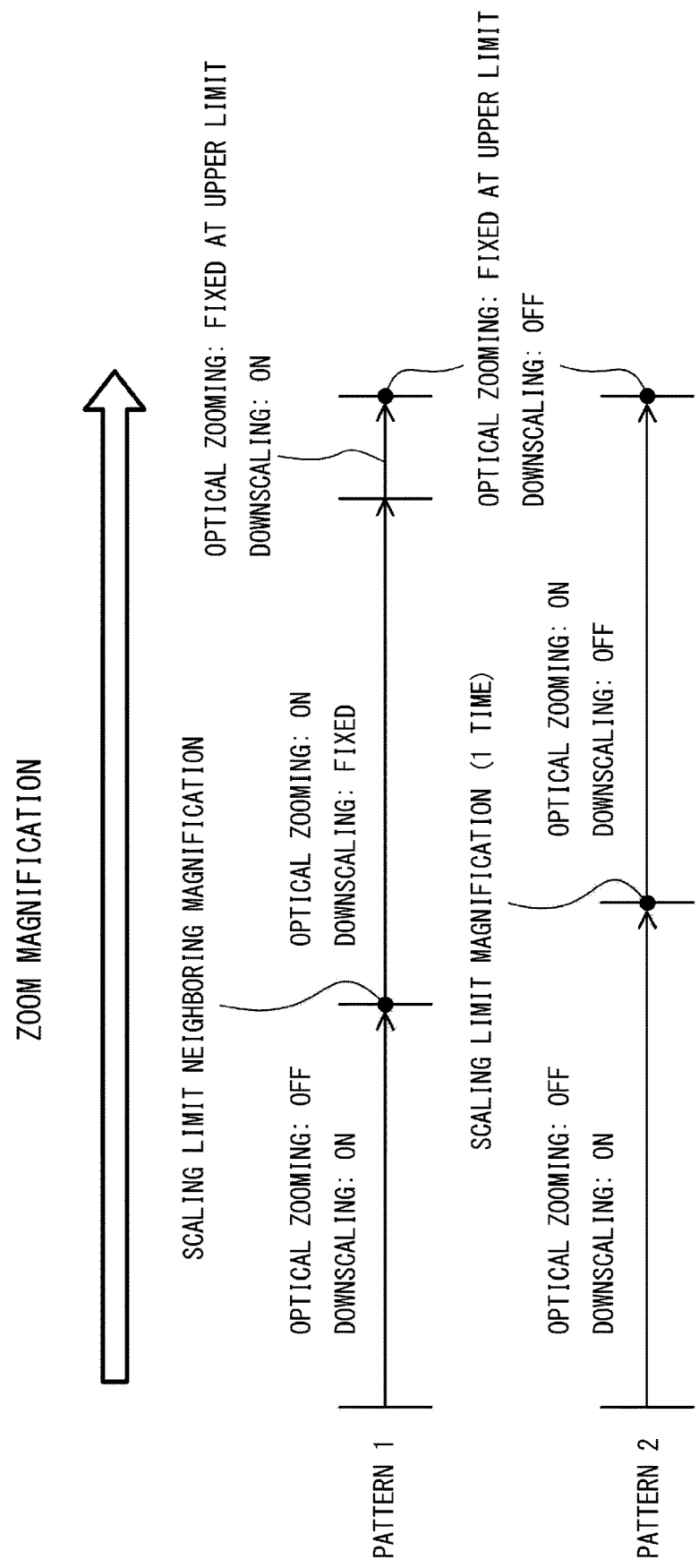
FIG. 18 is a diagram for describing an example of a case where optical zooming and downscaling are combined.

FIG. 18 is a diagram for describing an example of a case where the optical zooming and the downscaling are combined, and illustrates pattern 1 and pattern 2. In pattern 1, the optical zooming is turned off and the zooming by the downscaling is performed without performing the optical zooming a region where the designated zoom magnification is low to a downscaling limit neighboring magnification. The downscaling is fixed at the downscaling limit neighboring magnification. When the magnification exceeds the downscaling limit neighboring magnification, the optical zooming is turned on, and the zooming is performed to a magnification upper limit of the optical zooming. At this time, as the designated zoom magnification increases, the optical magnification of the optical zooming also increases. When the magnification exceeds the magnification upper limit of the optical zooming, the optical zooming is fixed, and the sensor zooming by the downscaling is performed. According to this pattern 1, since the downscaling can be executed (that is, remaining power of the sensor zooming can be left) even after the optical zooming, fine adjustment when a region to be finally output as the inspection target image is determined can be executed by the sensor zooming instead of the optical zooming.

In pattern 2, the zooming by the downscaling is performed without performing the optical zooming from a region where the zoom magnification is low to a downscaling limit magnification (1 time). Since the downscaling is performed up to the downscaling limit magnification, the downscaling is not performed thereafter. When the magnification exceeds the downscaling limit magnification, the zooming is performed to the magnification upper limit of the optical zooming by using the optical zooming.

That is, as described with reference to FIGS. 16 to 18, in a case where the zoom magnification instructed by the user via the interface unit 40*c* is equal to or less than a predetermined magnification, the logic unit 31*b* is configured to generate the inspection target image by downscaling the second captured image at the second scaling magnification calculated based on the instructed zoom magnification. On the other hand, in a case where the zoom magnification instructed by the user via the interface unit 40*c* is more than the predetermined magnification, the logic unit 31*b* is configured to generate the inspection target image corresponding to the instructed zoom magnification by the optical zooming by the zoom optical system. The predetermined magnification can be a zoom magnification at which the second scaling magnification is a scaling limit neighboring magnification near 1 time of the lower limit.

In a case where the zoom magnification instructed by the user via the interface unit 40c is more than the predetermined magnification, the calculation unit 41a performs the optical zooming by the zoom optical system. In addition, the logic unit 31b generates the inspection target image with the instructed zoom magnification by performing downscaling at the scaling limit neighboring magnification.

In addition, the interface unit 40c is configured to be able to receive a larger zoom magnification even after the optical magnification of the optical zooming reaches the upper limit. When the magnification reaches the upper limit of the zoom magnification that can be received by the interface unit 40c, the calculation unit 41a executes driving of the optical zooming at the optical magnification of the upper limit. In addition, the logic unit 31b generates the inspection target image by downscaling the captured image corresponding to the output region captured at the optical magnification of the upper limit of the zoom magnification that can be received by the interface unit 40c at a scaling magnification of 1 time (substantially without downscaling). That is, when the designation of the zoom magnification is received from the user, the calculation unit 41a calculates the optical magnification of the optical zooming and the scaling magnification of the downscaling based on the received zoom magnification. The zoom optical system is driven based on the calculated optical magnification.

In addition, the calculation unit 41a can receive a change in the zoom magnification as a change instruction signal by the interface unit 40c. In a case where the zoom magnification instructed to be changed based on the change instruction signal is equal to or less than the predetermined magnification, a control signal is transmitted to the image sensor 31 such that the downscaling of the captured image is executed at the scaling magnification calculated by the calculation unit 41a, and the downscaling is executed. On the other hand, in a case where the zoom magnification instructed to be changed based on the change instruction signal is more than the predetermined magnification, a drive signal is transmitted to the zoom optical system, that is, the zooming motor 56c to perform the optical zooming. The zooming motor 56c is operated by the drive signal, and a desired zoom magnification is obtained.

Figure 19A:
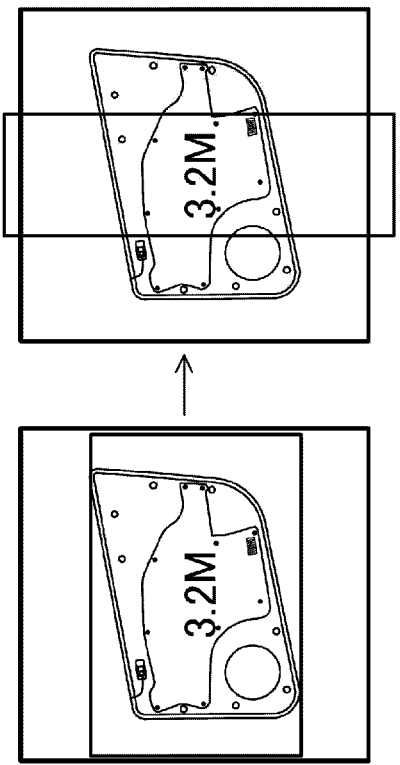
FIGS. 19A and 19B are diagrams for describing an example of a case where only an aspect ratio during downscaling is changed.
Figure 19B:
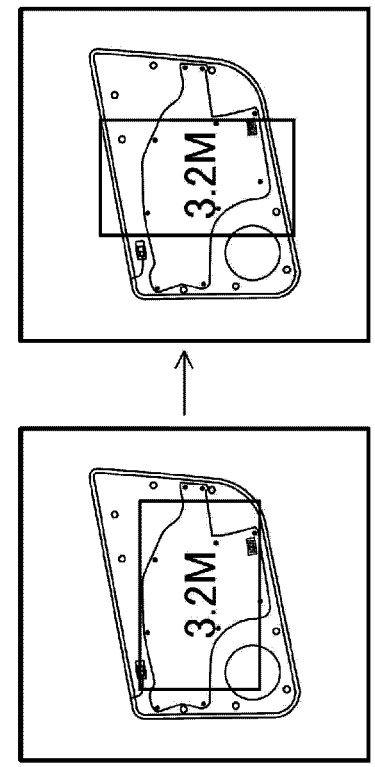

As illustrated in FIGS. 19A and 19B, the aspect ratio of the image can be changed during downscaling. FIGS. 19A and 19B illustrate a case where a horizontally long region of interest is changed to a vertically long region of interest, but on the contrary, a vertically long region of interest may be changed to a horizontally long region of interest. This change instruction is performed by the user via the number-of-pixels setting region 104 of the user interface screen 100 illustrated in FIG. 11. Note that, as illustrated in FIG. 19B, a case where the region of interest is positioned outside a range that can be captured by the photoelectric conversion unit 31a in the aspect ratio for which the change instruction is received due to the restriction of a shape of the photoelectric conversion unit 31a is considered. In this case, the calculation unit 41a recalculates the scaling magnification during downscaling to satisfy the aspect ratio for which the change instruction is received as much as possible, and the logic unit 31b generates the inspection target image by performing downscaling at the recalculated scaling magnification.

Figure 20C:
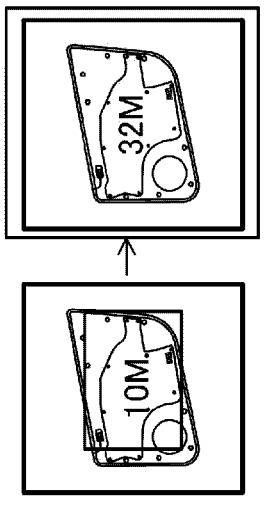
FIGS. 20A to 20F are diagrams for describing an example of a case where the number of pixels is increased or decreased during downscaling.
Figure 20B:
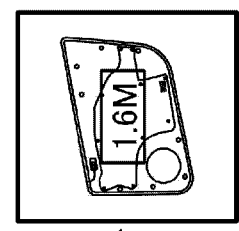
Figure 20A:
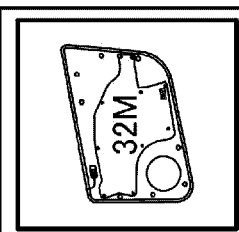

As illustrated in FIGS. 20A to 20F, the number of pixels can be increased or decreased during downscaling based on setting by the user. FIGS. 20A, 20B, and 20C illustrate a case where the number of pixels is changed without changing a spatial resolution (scaling magnification). In FIGS. 20A and 20B, since the number of pixels is changed within the range that can be captured by the photoelectric conversion unit 31a, the calculation unit 41a calculates the scaling magnification reflecting the setting by the user, and the logic unit 31b generates the inspection target image by performing downscaling at the calculated scaling magnification. On the other hand, in FIG. 20C, when the setting by the user is reflected, since the range exceeds the range that can be captured by the photoelectric conversion unit 31a, the calculation unit 41a calculates the scaling magnification to limit a change in the number of pixels without using the setting by the user. During calculation, the scaling magnification is made as close as possible to the setting by the user. The logic unit 31b generates the inspection target image by performing downscaling at the calculated scaling magnification.

Figure 20F:
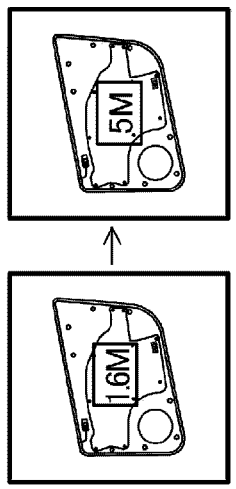
Figure 20E:
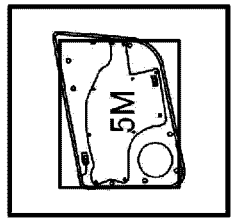
Figure 20D:
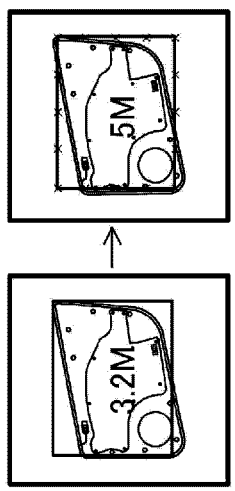

FIGS. 20D, 20E, and 20F illustrate a case where the number of pixels is changed without changing an imaging field of view. In FIGS. 20D and 20E, since the number of pixels is changed to a minimum resolution or more, the calculation unit 41a calculates the scaling magnification reflecting the setting by the user, and the logic unit 31b generates the inspection target image by performing downscaling at the calculated scaling magnification. On the other hand, since FIG. 20F illustrates the change to the number of pixels less than the minimum resolution, the calculation unit 41a calculates the scaling magnification to limit the change in the number of pixels without using the setting by the user, and the logic unit 31b generates the inspection target image by performing the downscaling with the calculated scaling magnification. That is, the calculation unit 41a is configured to be able to limit the change from the first number of pixels to the second number of pixels based on the setting by the user.

In addition, the interface unit 40c is configured to be able to receive a second zoom instruction to change the output region to a relatively smaller region and a second pan-tilt instruction to further adjust the output region in the X direction and the Y direction after the number-of-pixels change instruction by the user. Similar to the second zoom instruction, the second zoom instruction can be received by an instruction of the user. In addition, similar to the first pan-tilt instruction, the second pan-tilt instruction can be received by an instruction of the user.

In a case where the interface unit 40c receives the second zoom instruction and the second pan-tilt instruction, the calculation unit 41c calculates a scaling magnification necessary for setting the captured image corresponding to the output region changed by at least one of the second zoom instruction and the second pan-tilt instruction to have the second number of pixels within the field of view range of the photoelectric conversion unit 31a. The logic unit 31b generates the inspection target image with the second number of pixels by downscaling the captured image at the scaling magnification calculated by the calculation unit 41c.

Figure 21:
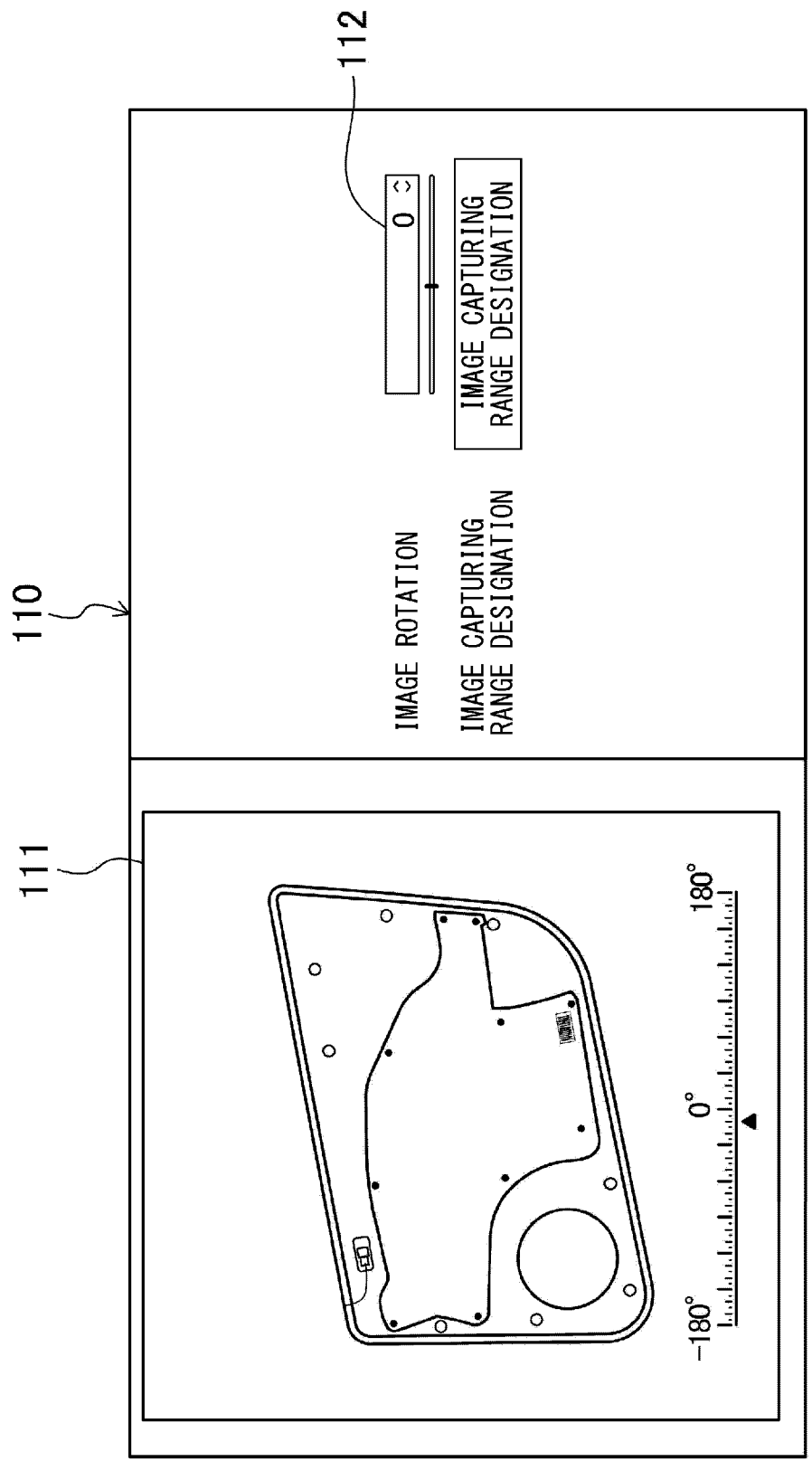
FIG. 21 is a diagram for describing an example of a case where an inspection target image after rotation is generated.

FIG. 21 is a diagram for describing an example of a case where the inspection target image after rotation is generated, and illustrates a user interface screen 110 for rotation setting. An image display region 111 where the inspection target image corresponding to the output region of the photoelectric conversion unit 31a is displayed, and a rotation angle setting region 112 are provided on the user interface screen 110 for rotation setting. In the rotation angle setting region 112, a rotation direction of the image and an rotation angle can be set, and these setting items can be set by the user operating the keyboard 7 or the mouse 8.

When the rotation direction and the rotation angle are set in the rotation angle setting region 112, the calculation unit 41a rotates the inspection target image by the set angle in the set direction in a state where the number of pixels and the shape of the inspection target image are set. That is, the calculation unit 41a applies rotation conversion processing of any angle to the inspection target image. As a result, since the inspection target image after rotation can be generated and displayed in the image display region 111, for example, when the installation direction of the industrial camera 1 is inclined, an inclination thereof can be corrected on software.

Figure 22:
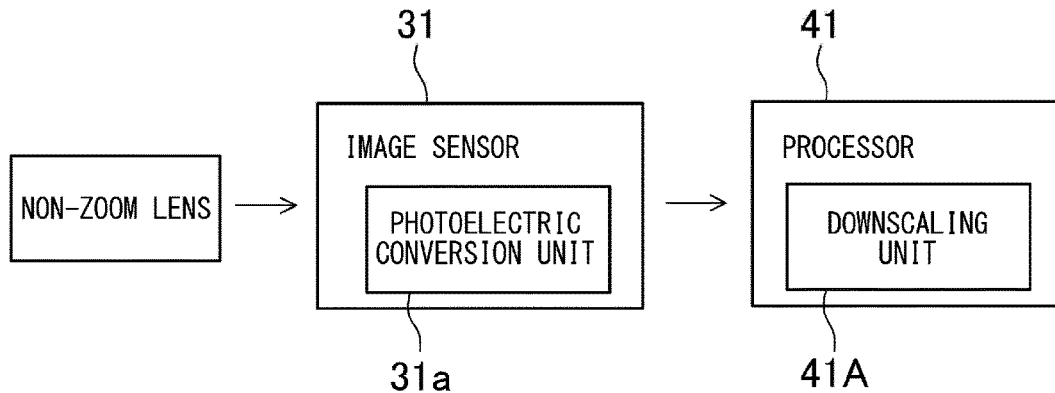
FIG. 22 is a diagram illustrating an example of a case where downscaling is realized by a processor.

FIG. 22 is a diagram illustrating an example of a case where downscaling is realized by the processor 41. As illustrated in this drawing, the lens unit is a non-zoom lens that cannot be optically zoomed. The image sensor 31 outputs the image captured by the photoelectric conversion unit 31a to the processor 41 without downscaling the image. A downscaling unit 41A is provided in the processor 41, and the downscaling unit 41A generates an inspection target image by executing downscaling as described above. The other processing is the same as the case where the image sensor 31 executes downscaling.

(Processing of Color Captured Image)

Since the color captured image can be generated by the image sensor 31, the interface unit 40c can receive the designation of the output region that is the region to be output as the color inspection target image in the field of view range of the photoelectric conversion unit 31a.

Figure 23:
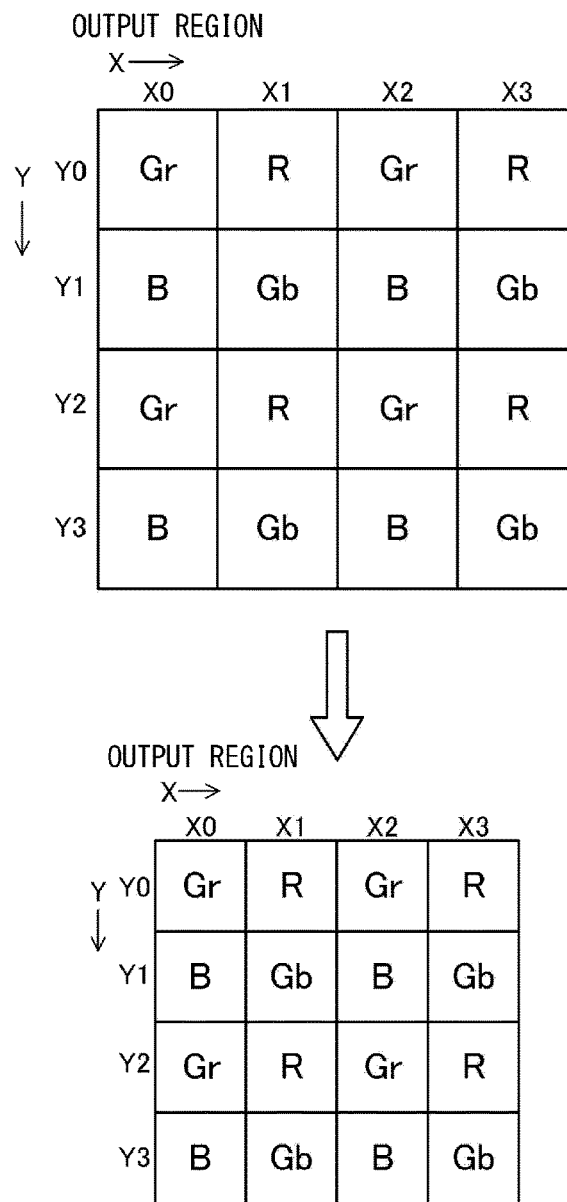
FIG. 23 is a conceptual diagram of a case where a color captured image is downscaled.

Since the image sensor 31 includes the color filter 31c, it is possible to generate the color captured image in which colors are formed in a predetermined array pattern. Specifically, the array pattern of the color captured images output by the photoelectric conversion unit 31a is a Bayer array as illustrated in FIG. 23. In the Bayer array, in addition to red components (R pixels) and blue components (B pixels), first green component (Gr pixels) and second green components (Gb pixels) are arrayed in a predetermined array pattern. The array pattern is not limited to the Bayer array, and may be another array pattern.

In addition, the photoelectric conversion unit 31a is configured to be able to generate color inspection target images with different numbers of pixels. In a case where the color captured image is generated by the photoelectric conversion unit 31a, the processor 41 executes arithmetic processing and image processing described above on the color inspection target image. In the present example, since the color filter 31c is provided, the color captured image can be generated without using a three-chip camera and without turning off RGB in time series.

After the color captured image corresponding to the output region of the field of view range of the photoelectric conversion unit 31a is acquired, the logic unit 31b individually downscales the colors of the color captured image based on the array pattern, and disposes pixel values of the colors after downscaling such that the array pattern of the colors coincides with the array pattern of the color captured image. As a result, it is possible to generate the color inspection target image with a smaller number of pixels than the number of pixels of the color captured image.

For example, as illustrated in FIG. 23, the logic unit 31b individually downscales the red component, the first green component adjacent to the red component in a row direction, the blue component and, and the second green component adjacent to the blue component in the row direction included in the Bayer array of the color captured image. The logic unit 31b generates the color inspection target image by disposing the pixel values of the colors of the blue component, the first green component, the red component, and the second green component after downscaling such that the array pattern of the colors coincides with the array pattern of the Bayer array of the color captured image.

That is, when the user designates, as the output region, the region to be output as the color inspection target image, the colors of the color captured image corresponding to the output region are individually downscaled based on the predetermined array pattern. The pixel values of the colors after downscaling are disposed such that the array pattern of the colors coincides with the array pattern of the color captured image. As a result, it is possible to generate the color inspection target image with any number of pixels smaller than the number of pixels of the color captured image, and in image processing by a processor or an FPGA at a subsequent stage, additional processing due to incoincidence between the array patterns is unnecessary.

Describing a specific example, the logic unit 31b is configured to generate the color inspection target image by downscaling the colors of the color captured image in a first direction that is one of the X and Y directions and then downscaling the image obtained by downscaling in the first direction in a second direction that is the other of the X and Y directions. More specifically, as illustrated in FIG. 24, the logic unit 31b generates the color inspection target image by downscaling the colors of the color captured image in the first direction and then downscaling the image obtained by the downscaling in the first direction in the second direction. In FIG. 24, pixel interpolation and downscaling are performed on the Gr pixels in a horizontal direction (X direction) that is the first direction, and then pixel interpolation and downscaling the Gr pixels in a vertical direction (Y direction) that is the second direction. In addition, similar to the Gr pixels, pixel interpolation and downscaling are performed on each of the R pixels, the B pixels, and the Gb pixels in the horizontal direction, and then pixel interpolation and downscaling are performed on each of the R pixels, the B pixels, and the Gb pixels in the vertical direction.

Figure 25A:
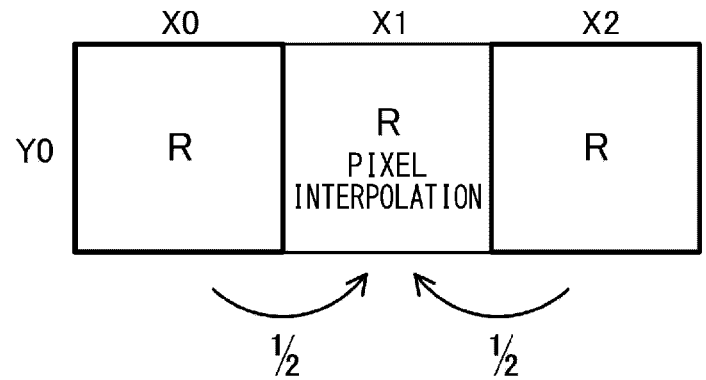
FIGS. 25A-B are diagrams illustrating an example of interpolation processing and downscaling of each pixel constituting the color captured image.
Figure 25B:
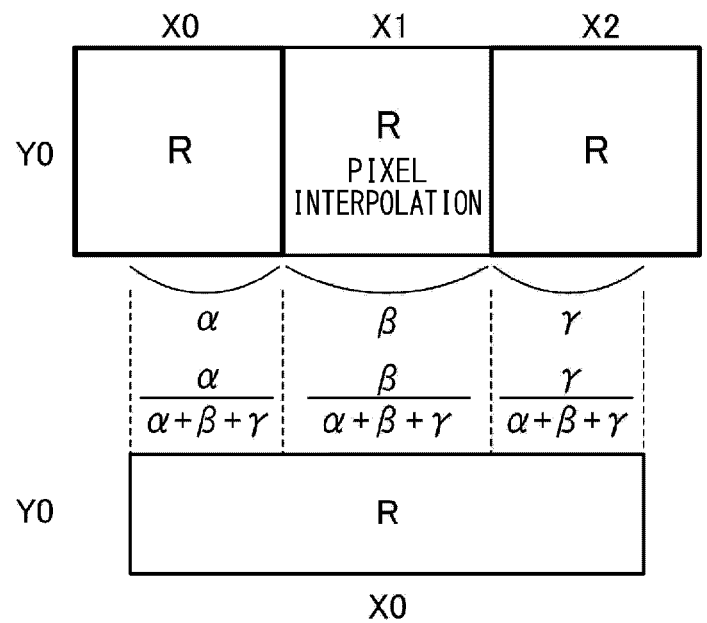

As illustrated in the case of the horizontal direction in FIG. 25, when pixel interpolation is performed, an addition average of two adjacent pixel values of the same color is calculated. In addition, during downscaling, a weighted average corresponding to a size at a sub-pixel level of each pixel of the captured image before downscaling, which is included in one pixel of the inspection target image obtained by downscaling, is calculated. In FIG. 25, $\alpha$, $\beta$, and $\gamma$ indicate sub-pixel sizes in a case where a size of an input pixel is 1. In addition, since each of $\alpha$ and $\gamma$ can be set to a value less than 1, the scaling magnification can be calculated with accuracy after the decimal point. In addition, similar processing is executed for other R pixel groups in the image. Although the R pixels are illustrated in FIG. 25, the same applies to the pixels of the other colors.

In the vertical direction, similar processing is executed in the vertical direction by using the pixel after downscaling in the horizontal direction. That is, the logic unit 31b calculates the pixel values of the pixels of the inspection target image based on the plurality of pixels of the same color present in a range in the vicinity of a position of the color captured image before downscaling corresponding to the pixels of the inspection target image after downscaling. The logic unit 31b determines the range in the vicinity of the color captured image based on the scaling magnification of downscaling.

Figure 26:
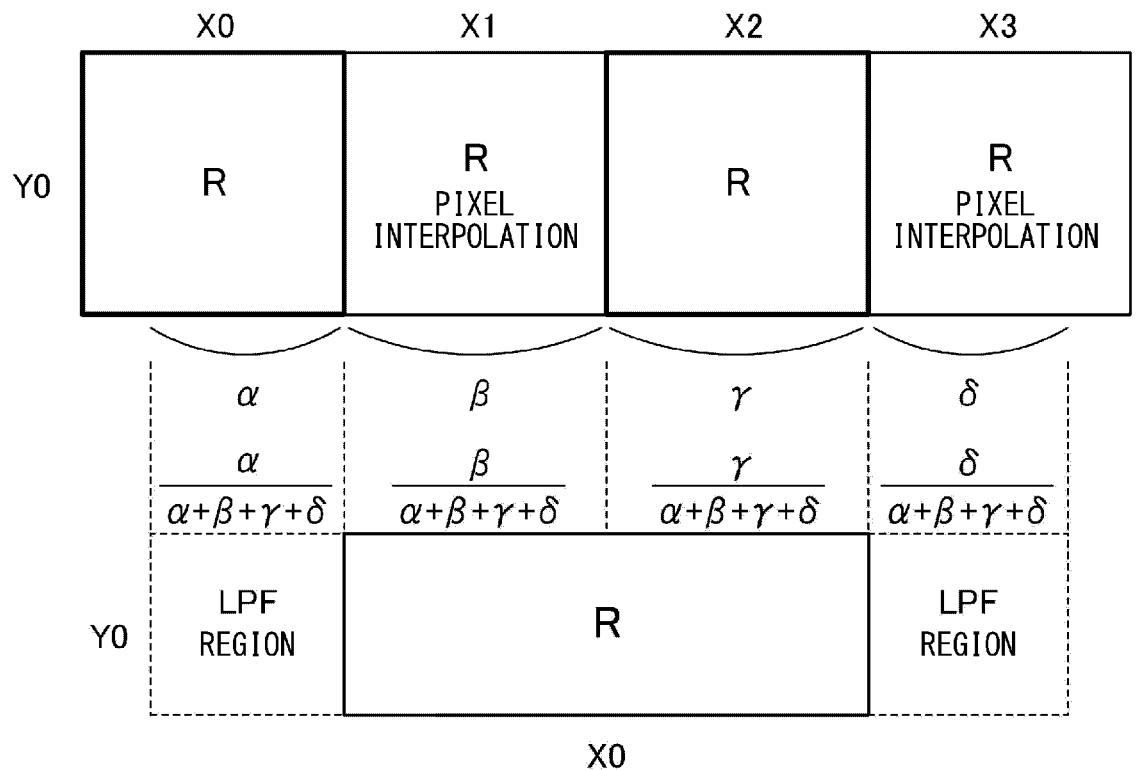
FIG. 26 is a diagram for describing a case where a low-pass filter is applied.

As illustrated in FIG. 26, a low-pass filter can also be applied when the color captured image is processed. In this case, downscaling is performed on the assumption that one pixel of the inspection target image after downscaling is enlarged by a designated low-pass filter region (LPF region). The low-pass filter region is uniformly applied to both sides of one pixel after downscaling. The low-pass filter region (sub-pixel size) per one side is calculated by multiplying a reduction degree by downscaling by a low-pass filter set value by ½. In addition, the low-pass filter set value is a value equal to or more than 0 and is less than a value obtained by {3×(reduction degree−1)}/reduction degree. In FIG. 26, α, β, γ, and δ indicate sub-pixel sizes in a case where the size of the input pixel is 1. In addition, similar processing is executed for other R pixel groups in the image. Although the R pixels are illustrated in FIG. 26, the same applies to the pixels of the other colors.

In addition, when the interface unit 40c receives an instruction to change the number of pixels, the processor 41 causes the array pattern of the colors of the color inspection target image before and after the change in the number of pixels to coincide with each other. As a result, the image processing of the color inspection target image after the change can be executed without changing the setting related to the array pattern of each color in the image processing of the color inspection target image before the change.

In a case where the interface unit 40c receives an instruction to change at least one of the position, size, and shape of the output region, the logic unit 31b generates the color inspection target image corresponding to the output region after the change in which the array pattern of the colors coincides with the color inspection target image generated before the change of the output region.

In addition, the logic unit 31b downscales the color captured image such that a transfer speed at which the color inspection target image is transferred to the processor 41 is relatively faster than a transfer speed at which the color captured image is transferred to the processor 41. That is, as illustrated in FIG. 22, although downscaling can be performed outside the image sensor 31, in this case, since a data amount of the color captured image is large, it is considered that the transfer speed to the processor 41 becomes a problem. The color captured image is downscaled, and the color inspection target image is transferred to the processor 41 at a speed faster than the transfer speed when the color captured image is transferred to the processor 41. Thus, a processing speed can be increased, and image inspection for a high-speed moving object can be performed. In addition, the transfer speed from the logic unit 31b to the processor 41 can be changed according to the number of pixels of the inspection target image output from the image sensor 31.

(Flow During Setting)

As described above, the image inspection system 2 including the industrial camera 1 can execute various kinds of processing, and a processing procedure can be randomly set within a range without contradiction. Hereinafter, an example of the processing procedure will be described based on a flowchart.

Figure 27:
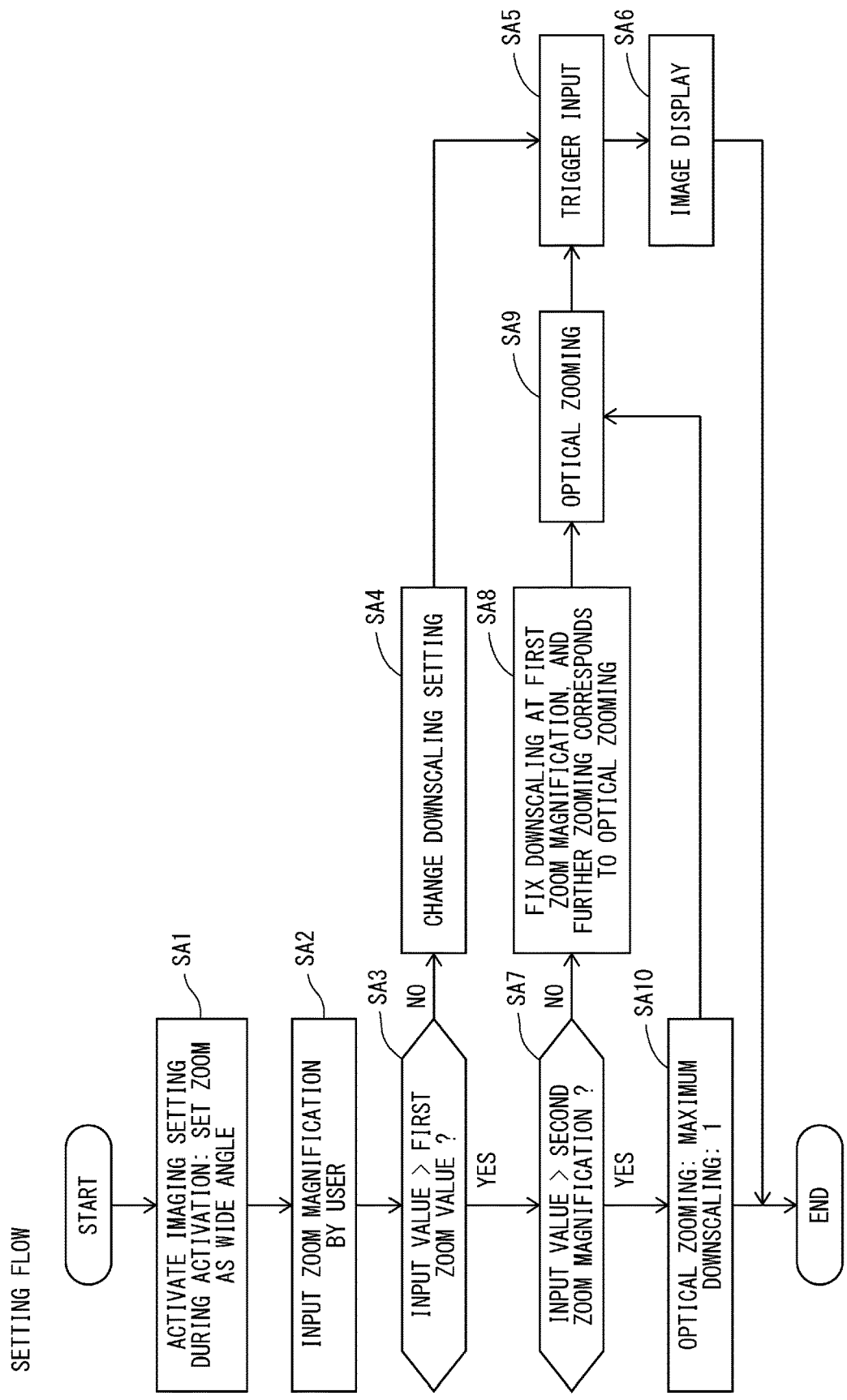
FIG. 27 is a flowchart illustrating an example of a processing procedure during a zoom magnification input.

FIG. 27 is a flowchart illustrating an example of a processing procedure during zoom magnification input. In step SA1 after the start, imaging setting is activated. When the imaging setting is activated, the second lens group 22 is moved to a wide-angle side. In step SA2, the interface unit 40c receives an input of the zoom magnification by the user. During the zoom magnification input, since the user interface screen 100 illustrated in FIG. 11 is used, the zoom adjustment region 101A can be operated and input. As another example, the zoom magnification may be input numerically.

In step SA3, it is determined whether or not an input value (zoom magnification) in step SA2 is more than a first zoom value (first zoom magnification). In a case where NO is determined, the processing proceeds to step SA4 to change the downscaling setting. When the trigger signal is input in step SA5, the processing proceeds to step SA6 to display the inspection target image.

In a case where YES is determined in step SA3, the processing proceeds to step SA7, and it is determined whether or not the input value (zoom magnification) in step SA2 is more than a second zoom value (second zoom magnification). In a case where NO is determined, the processing proceeds to step SA8 to fix downscaling at a predetermined zoom magnification, and further zooming corresponds to the optical zooming in step SA9. Thereafter, the processing proceeds to step SA5.

In a case where YES is determined in step SA7, the zoom magnification of the optical zooming is maximized and the scaling magnification of the downscaling is set to 1 in step SA10. The processing proceeds to step SA9.

Figure 28:
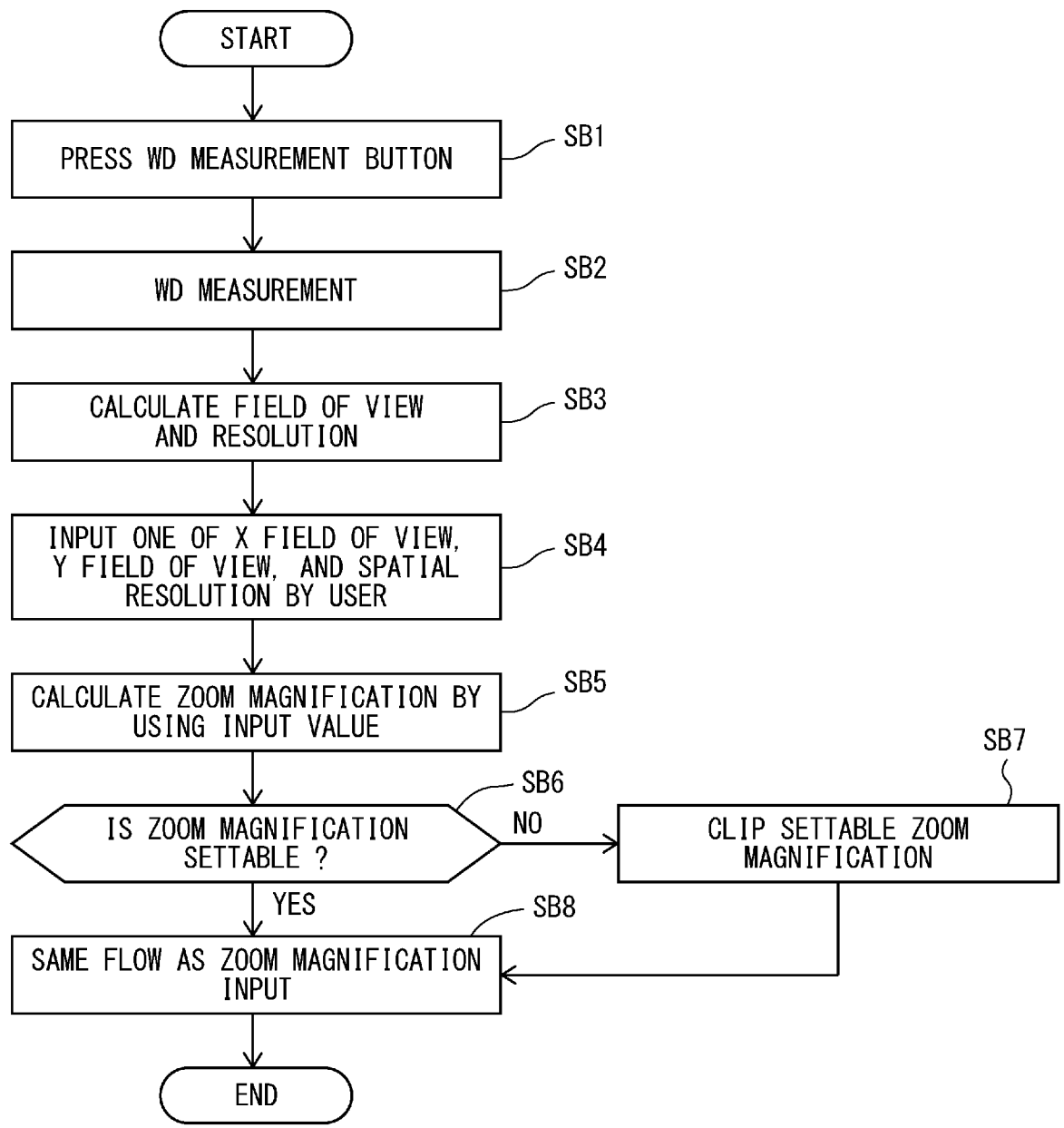
FIG. 28 is a flowchart illustrating an example of a processing procedure during designation of a field of view resolution.

FIG. 28 is a flowchart illustrating an example of a processing procedure when the field of view or the resolution is designated. In step SB1 after the start, a WD measurement button (not illustrated) on the user interface is pressed. In step SB2, WD measurement is performed. In step SB3, the field of view and the resolution are calculated based on internal data stored in advance in the industrial camera 1 and current focal position information. In step SB4, the user inputs one of an X field of view, a Y field of view, and a spatial resolution via the user interface. In step SB5, the zoom magnification is calculated by using the value input in step SB4. In step SB6, it is determined whether or not the zoom magnification calculated in step SB5 is a settable zoom magnification. In a case where NO is determined in step SB6, the processing proceeds to step SB7 to clip the zoom magnification to a settable zoom magnification as illustrated in FIG. 19B of FIG. 19 or FIGS. 20C and 20F of FIG. 20. In a case where YES is determined in step SB6, the processing proceeds to step SB8 to execute a procedure similar to the flow illustrated in FIG. 27.

Figure 29:
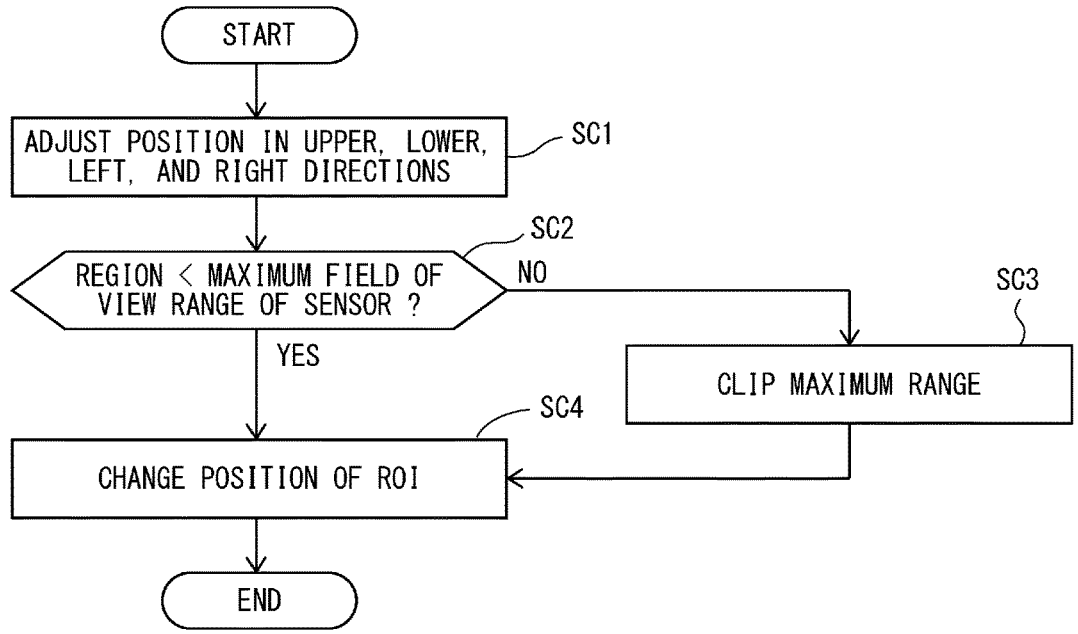
FIG. 29 is a flowchart illustrating an example of a processing procedure of pan-tilting.

FIG. 29 is a flowchart illustrating an example of a processing procedure of pan-tilting. In step SC1 after the start, the user operates the field of view position adjustment region 103 on the user interface screen 100 illustrated in FIG. 11 to adjust positions in the upper, lower, left, and right directions. In step SC2, it is determined whether or not the region of which the position is adjusted in step SC1 is narrower than a maximum field of view range of the image sensor 31. In a case where NO is determined in step SC2, a maximum range is clipped in step SC3. Thereafter, the processing proceeds to step SC4, and the position of the region of interest is changed. In a case where YES is determined in step SC2, the processing also proceeds to step SC4.

Figure 30:
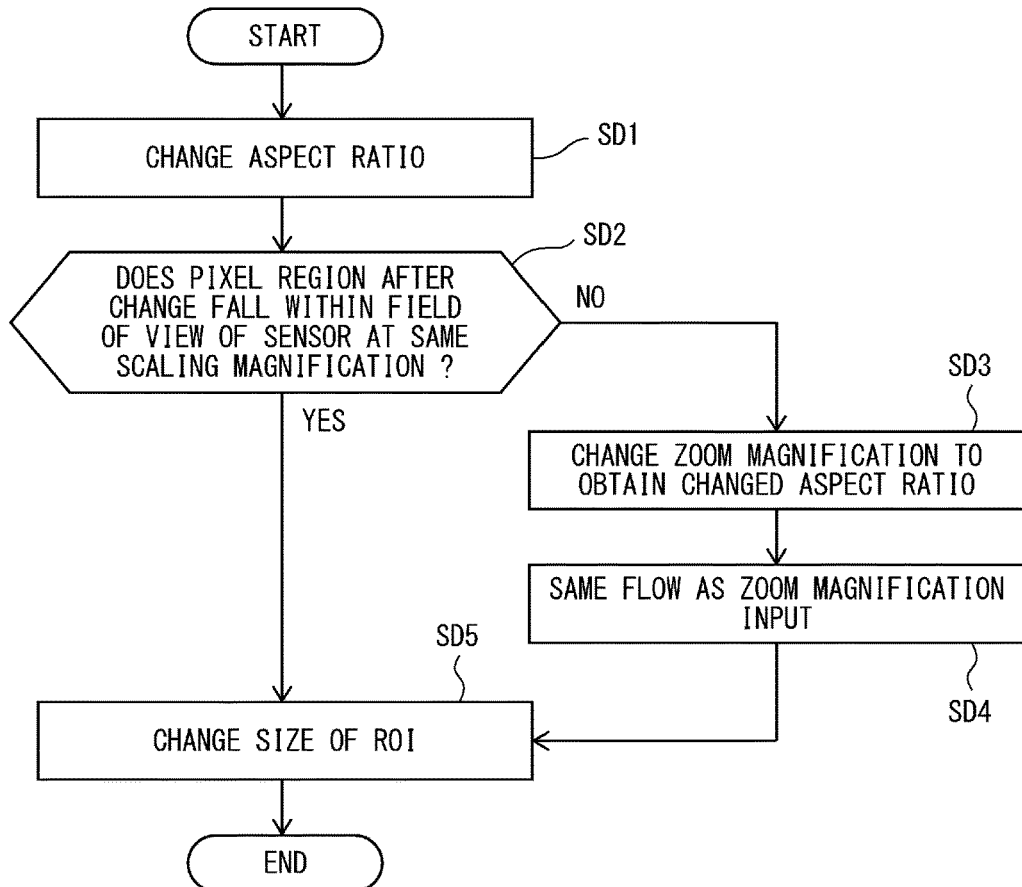
FIG. 30 is a flowchart illustrating an example of a processing procedure of changing an aspect ratio.

FIG. 30 is a flowchart illustrating an example of a processing procedure of changing the aspect ratio. In step SD1 after the start, the user operates the number-of-pixels setting region 104 of the user interface screen 100 illustrated in FIG. 11 to change the aspect ratio to a desired aspect ratio. In step SD2, it is determined whether or not the pixel region after the change falls within the field of view range of the image sensor 31 at the same scaling magnification. In a case where NO is determined, the processing proceeds to step SD3, and the zoom magnification is changed such that the aspect ratio changed in step SD1 is obtained. In step SD4, a procedure similar to the flow illustrated in FIG. 27 is executed. Thereafter, the processing proceeds to step SD5 to change the size of the region of interest. In a case where YES is determined in step SD2, the processing also proceeds to step SD5.

The above-described embodiment is merely an example in all respects, and should not be construed in a limiting manner. Further, all modifications and changes falling within an equivalent scope of the claims are within the scope of the invention.

As described above, the industrial camera according to the invention can be used in a case where the inspection target image for inspecting various inspection objects is generated.

What is claimed is:

1. An industrial camera that generates an inspection target image obtained by capturing an inspection object, comprising:
    a zoom optical system that electrically performs optical zooming;
    an imaging unit that captures the inspection object to be able to generate a captured image with a number of pixels larger than a number of pixels of the inspection target image;
    an image generation unit that generates an inspection target image with a number of pixels smaller than a number of pixels of a captured image corresponding to an output region that is a region of a field of view range of the imaging unit in whole or part by executing downscaling on the captured image;
    an interface unit that receives designation of a zoom magnification from a user; and
    a calculation unit that calculates an optical magnification of the optical zooming and a scaling magnification of the downscaling based on the zoom magnification, and drives the zoom optical system based on the optical magnification,
    wherein, in a case where the zoom magnification is smaller than or equal to a predetermined magnification, the calculation unit calculates a scaling magnification based on the zoom magnification, and the image generation unit generates an inspection target image by downscaling a captured image at the scaling magnification, and
    in a case where the zoom magnification is larger than the predetermined magnification, the calculation unit calculates an optical magnification of the optical zooming based on the zoom magnification and drives the zoom optical system, and the image generation unit generates an inspection target image based on a captured image generated at the optical magnification.

2. The industrial camera according to claim 1, wherein the predetermined magnification is a zoom magnification at which the scaling magnification is a scaling limit neighboring magnification near 1 time of a lower limit, and
    in a case where the designated zoom magnification is larger than the predetermined magnification, the image generation unit generates an inspection target image at the designated zoom magnification by downscaling, at the scaling limit neighboring magnification, the captured image obtained at the optical magnification.

3. The industrial camera according to claim 2, wherein the interface unit is configured to receive a larger zoom magnification after the optical magnification of the optical zooming reaches an upper limit, and
    when the interface unit receives a zoom magnification smaller than an upper limit of the zoom magnification that is able to be received by the interface unit and larger than an upper limit of the optical magnification, the image generation unit generates an inspection target image by downscaling, at a scaling magnification smaller than the scaling limit neighboring magnification, a captured image captured at an optical magnification of the upper limit.

4. The industrial camera according to claim 1, wherein when the zoom magnification reaches an upper limit of a zoom magnification that is able to be received by the interface unit, the calculation unit executes driving of optical zooming at an optical magnification of the upper limit, and
    the image generation unit generates, as an inspection target image, a captured image corresponding to the output region captured at the optical magnification of the upper limit.

5. The industrial camera according to claim 1, further comprising
    an image sensor that receives light concentrated by the zoom optical system to generate an inspection target image,
    wherein the image sensor includes a photoelectric conversion unit as the imaging unit that generates the captured image with the number of pixels larger than the number of pixels of the inspection target image, and a logic unit as the image generation unit that executes the downscaling on the captured image based on the scaling magnification calculated by the calculation unit, and
    the photoelectric conversion unit and the logic unit are mounted on the same chip constituting the image sensor.

6. The industrial camera according to claim 4, wherein the image generation unit generates the inspection target image without performing the downscaling on the captured image captured at the optical magnification of the upper limit.

7. The industrial camera according to claim 1, wherein, in a case where the zoom magnification is larger than the predetermined magnification, the image generation unit generates an inspection target image by downscaling, at the scaling magnification, the captured image generated at the optical magnification.

8. The industrial camera according to claim 1, wherein
    in a case where the zoom magnification is larger than the predetermined magnification,
    the zoom optical system fluctuates a field of view range of the imaging unit with an optical axis as a center,
    the imaging unit generates a captured image having the field of view range fluctuated along the optical axis, and
    the image generation unit generates an inspection target image by downscaling, at the scaling magnification, a captured image corresponding to a partial region having a center position other than the optical axis of the field of view range fluctuated along the optical axis.

9. The industrial camera according to claim 1, further comprising
    a housing that accommodates the imaging unit, and a lens unit including the zoom optical system,
    wherein the lens unit is fixed to and integrated with the housing.

* * * * *